(12) United States Patent
Yang et al.

(10) Patent No.: US 7,713,604 B2
(45) Date of Patent: May 11, 2010

(54) CURABLE ADHESIVE ARTICLES HAVING TOPOGRAPHICAL FEATURES THEREIN

(75) Inventors: Jie Yang, Woodbury, MN (US); Kenneth J. Callahan, Shoreview, MN (US); Ying-Yuh Lu, Woodbury, MN (US); Yaoqi J. Liu, Shoreview, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 154 days.

(21) Appl. No.: 10/513,180

(22) PCT Filed: May 28, 2003

(86) PCT No.: PCT/US03/16590

§ 371 (c)(1),
(2), (4) Date: Nov. 1, 2004

(87) PCT Pub. No.: WO03/099953

PCT Pub. Date: Dec. 4, 2003

(65) Prior Publication Data

US 2005/0227031 A1    Oct. 13, 2005

(51) Int. Cl.
*B32B 9/00* (2006.01)
(52) U.S. Cl. .................... 428/40.1; 428/40.2; 428/41.9; 428/42.1
(58) Field of Classification Search ................ 428/40.1, 428/40.2, 41.9, 42.1
See application file for complete search history.

(56) References Cited

U.S. PATENT DOCUMENTS

| | | | |
|---|---|---|---|
| 3,018,262 A | 1/1962 | Schroeder | |
| 3,117,099 A | 1/1964 | Proops et al. | |
| 3,301,741 A | 1/1967 | Henrickson et al. | |
| 3,562,223 A | 2/1971 | Bargain et al. | |
| 3,565,972 A | 2/1971 | Harris | |
| 3,595,900 A | 7/1971 | Loudas et al. | |
| 3,627,780 A | 12/1971 | Bonnard et al. | |
| 3,733,349 A | 5/1973 | Loudas et al. | |
| 3,839,358 A | 10/1974 | Bargain et al. | |
| 3,962,184 A | 6/1976 | Notomi et al. | |
| 4,022,755 A | 5/1977 | Tanigaichi et al. | |
| 4,026,913 A | 5/1977 | Tanigaichi et al. | |
| 4,116,946 A | 9/1978 | Jakob et al. | |
| 4,195,132 A | 3/1980 | Sundermann et al. | |
| 4,468,497 A | 8/1984 | Street et al. | |
| 4,503,211 A | 3/1985 | Robins | |
| 4,528,366 A | 7/1985 | Woo et al. | |

(Continued)

FOREIGN PATENT DOCUMENTS

EP       0279579 A1    8/1988

(Continued)

OTHER PUBLICATIONS

Satas D., "Handbook of Pressure Sensitive Adhesive Technology, 2$^{nd}$ Ed.", Van Nostrand Reinhold, New York, NY, pp. 171-176 (1989).

(Continued)

*Primary Examiner*—Victor S Chang
(74) *Attorney, Agent, or Firm*—Colene H. Blank

(57) ABSTRACT

Curable adhesive articles having topographical features and methods of making curable adhesive articles are disclosed.

49 Claims, 7 Drawing Sheets

U.S. PATENT DOCUMENTS

| | | |
|---|---|---|
| 4,709,008 A | 11/1987 | Shimp |
| 4,740,584 A | 4/1988 | Shimp |
| 4,751,138 A | 6/1988 | Tumey et al. |
| 4,868,288 A | 9/1989 | Meier |
| 4,985,340 A | 1/1991 | Palazzotto et al. |
| 5,073,423 A | 12/1991 | Johnson |
| 5,086,088 A | 2/1992 | Kitano et al. |
| 5,143,785 A | 9/1992 | Pujol et al. |
| 5,252,694 A | 10/1993 | Willett et al. |
| 5,260,215 A | 11/1993 | Clapp et al. |
| 5,268,228 A | 12/1993 | Orr |
| 5,296,277 A | 3/1994 | Wilson et al. |
| 5,344,681 A | 9/1994 | Calhoun et al. |
| 5,587,009 A * | 12/1996 | Besse et al. .................. 106/244 |
| 5,593,759 A * | 1/1997 | Vargas et al. ................. 428/200 |
| 5,738,939 A | 4/1998 | Calhoun |
| 5,874,143 A | 2/1999 | Peloquin et al. |
| 5,897,727 A | 4/1999 | Staral et al. |
| 5,908,700 A | 6/1999 | Shimizu et al. |
| 6,197,397 B1 | 3/2001 | Sher et al. |
| 6,299,966 B1 | 10/2001 | Bonke et al. |
| 6,467,676 B1 | 10/2002 | Wang |
| 6,921,782 B2 | 7/2005 | Matsushima |
| 7,010,212 B2 | 3/2006 | Emmons et al. |
| 2002/0182955 A1 | 12/2002 | Weglewski et al. |
| 2003/0192638 A1 | 10/2003 | Yang et al. |
| 2003/0221770 A1 * | 12/2003 | Meixner et al. .............. 156/230 |
| 2004/0127594 A1 | 7/2004 | Yang et al. |

FOREIGN PATENT DOCUMENTS

| | | |
|---|---|---|
| EP | 0 306 161 A2 | 3/1989 |
| EP | 0 306 162 A2 | 3/1989 |
| EP | 0306161 | 3/1989 |
| EP | 0 344 911 A2 | 12/1989 |
| EP | 0306162 | 10/1995 |
| GB | 1511060 | 5/1978 |
| WO | WO 93/05123 | 3/1993 |
| WO | WO 94/00525 | 1/1994 |
| WO | WO 95/11945 | 5/1995 |
| WO | WO 98/21287 | 5/1998 |
| WO | WO 01/02093 A2 | 1/2001 |

OTHER PUBLICATIONS

Kinney, Robert et al., "Fluxing Compositions", U.S. Appl. No. 09/946,013, filed Sep. 4, 2001.

* cited by examiner

CURABLE ADHESIVE ARTICLES HAVING TOPOGRAPHICAL FEATURES THEREIN

FIELD OF THE INVENTION

The present invention relates to curable adhesive articles and methods of making curable adhesive articles.

BACKGROUND OF THE INVENTION

Pressure sensitive adhesives (PSAs) are used in a variety of applications due to their desirable characteristics such as tackiness at room temperature, bondability using a minimal amount of bonding pressure, bonding strength, and ease of application. However, in some applications, PSAs do not provide needed adhesive layer properties. For example, application of conventional PSAs on acrylic sheets and polycarbonate sheets that are known to be "out-gassing materials" and difficult to bond, may result in bubbling and delamination. In addition, conventional PSAs flow over time and/or lose any structural or topographical features, such as microstructures and/or macrostructures, present within the PSA layer when exposed to elevated temperatures and/or pressures.

Curable adhesives (e.g. heat or light cured) are also used in a number of applications. Curable adhesives have a number of desirable characteristics, such as substantial permanency and high strength adherence; however, conventional curable adhesives do not possess the desirable features of PSAs described above, such as initial tackiness.

SUMMARY OF THE INVENTION

The present invention is directed to a curable adhesive layer having structural or topographical features, pressure-sensitive adhesive properties prior to curing, and, after at least partial curing, flow resistance even when exposed to elevated temperatures. The curable adhesive layer maintains at least a portion of its structural or topographical features prior to and after bonding to one or more substrates. The curable adhesive layer possesses a desired amount of tackiness prior to and during bonding to one or more substrates, and may be cured to form a structural adhesive layer having permanent topographical features therein. In one exemplary embodiment of the present invention, the curable adhesive layer comprises a plurality of microstructures or macrostructures forming at least a portion of a first outermost surface of the curable adhesive layer, wherein the first outermost surface of the curable adhesive layer has (i) sufficient tackiness to bond to a substrate, and (ii) cures to a structural state so as to substantially retain an initial structured surface profile when exposed to temperatures greater than about 37.8° C. (100° F.)

The present invention is also directed to curable adhesive articles comprising one or more curable adhesive layers and, optionally, one or more additional layers. In one exemplary embodiment of the present invention, the article of manufacture comprises (a) a curable adhesive layer having a plurality of microstructures or macrostructures forming at least a portion of a first outermost surface of the curable adhesive layer, wherein the curable adhesive layer has (i) sufficient tackiness to bond to a substrate, and (ii) cures to a structural state so as to substantially retain an initial structured surface profile when exposed to temperatures greater than about 37.8° C. (100° F.); and (b) at least one additional layer on an outermost surface of the curable adhesive layer. The exemplary curable adhesive article may further comprise other layers including, but not limited to, a second adhesive layer, such as a pressure-sensitive adhesive layer, at least one microstructured or macrostructured release liner, at least one non-adhesive substrate layer, or any combination thereof.

The present invention is further directed to a method of making curable adhesive layers and articles containing the same. In one exemplary embodiment of the present invention, a curable adhesive article is formed by a method comprising coating a curable adhesive onto a microstructured or macrostructured release liner to form a curable adhesive layer having a plurality of microstructures or macrostructures on at least a portion of a first outermost surface of the curable adhesive in contact with the release liner, wherein the first outermost surface of the curable adhesive layer has (i) sufficient tackiness to bond to a substrate, and (ii) cures to a structural state so as to substantially retain an initial structured surface profile when exposed to temperatures greater than about 37.8° C. (100° F.).

In a further exemplary embodiment of the present invention, a curable adhesive layer and article are formed by a method comprising forming an embossible layer of curable adhesive, and embossing at least one outer surface of the embossible layer with a microstructured or macrostructured release liner or tool to form a curable adhesive layer having a plurality of microstructures or macrostructures on at least a portion of a first outermost surface of the curable adhesive in contact with the release liner, wherein the first outermost surface of the curable adhesive layer has (i) sufficient tackiness to bond to a substrate, and (ii) cures to a structural state so as to substantially retain an initial structured surface profile when exposed to temperatures greater than about 37.8° C. (100° F.).

These and other features and advantages of the present invention will become apparent after a review of the following detailed description of the disclosed embodiments and the appended claims.

BRIEF DESCRIPTION OF THE DRAWINGS

The present invention is further described with reference to the appended figures, wherein.

DETAILED DESCRIPTION OF THE INVENTION

Figure 1:
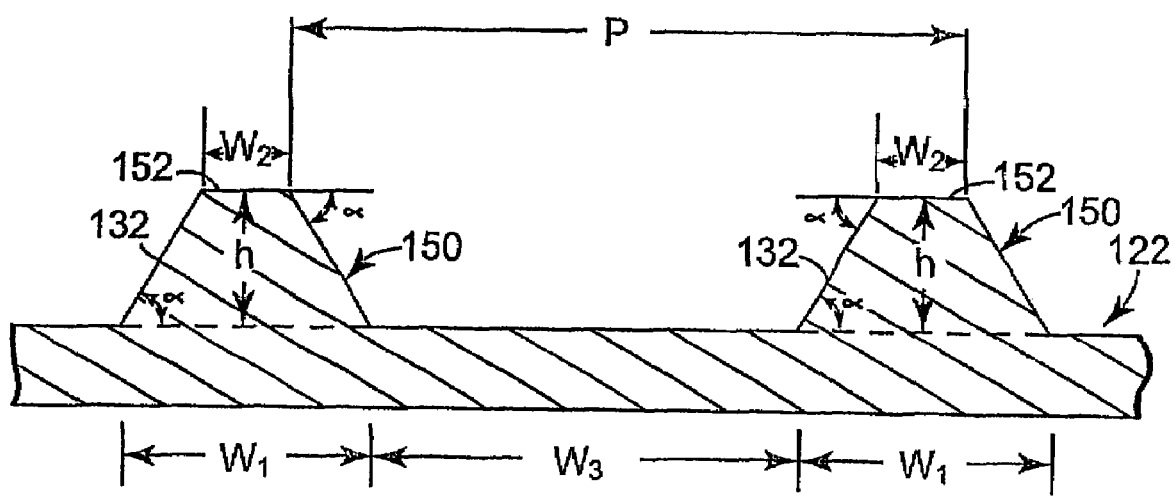
FIG. 1 is a cross-sectional view of an exemplary curable adhesive layer of the present invention.

The present invention is directed to microstructured or macrostructured adhesives that have (i) sufficient tackiness to bond to a substrate, and (ii) cure to a structural state so as to substantially retain an initial structured surface profile when exposed to temperatures greater than about 37.8° C. (100° F.). The microstructured or macrostructured adhesives also substantially retain their topographical features during lamination processes and in final products. During a lamination process, the adhesive topographical features may exhibit some deformation when pressure is applied to adhere the adhesive to a substrate. When deformation of the topographical features occurs during lamination, the deformed features are substantially maintained in the final products. The adhesive topographical features in the final products may be on the outer surface of the products. In such instances, the adhesive topographical features may look approximately like the structure before and after curing, e.g., having the same general shape and dimensions. When another substrate is laminated to the topographical features, the topographical features may be deformed from the pressure of lamination, e.g., exhibiting flattening of tips on the topographical features and/or an increase in the contact area of the individual features.

The adhesive may be a structural hybrid adhesive that has two stages, a pressure-sensitive adhesive (PSA) stage prior to curing into a structural (e.g., thermostable) stage. The adhesive may also be a dual layer or multi-layer system, wherein at least one outermost layer is a PSA, a structural adhesive, or a structural hybrid adhesive layer and at least one other layer is a structural hybrid adhesive or a structural adhesive layer. The adhesives can be provided in various forms such as on a release liner or as a tape. The adhesive may be used to laminate two substrates together, or may be laminated to a single substrate to form topographical features on the substrate. The adhesive may have topographical features on one or both sides of an adhesive layer. When there is a dual layer, such as a PSA layer and a structural hybrid layer, the topographical features may be formed on the PSA side, the structural hybrid side, or both. The PSA layer or a second structural hybrid layer may also be formed on top of topographical features formed from a cured or partially cured structural or structural hybrid adhesive.

A number of terms are used to describe various aspects of the present invention. A list of terms is provided below:

As used herein, a "structured adhesive" refers to an adhesive with physically superimposed three-dimensional topographical features, such as microstructures and/or macrostructures.

As used herein, "topographical feature(s)" refers to the overt shape and size of adhesive masses along a surface of an adhesive layer. The size of the masses can vary from being microstructures, macrostructures, or a combination thereof. Further, as used herein, "features" refers to topographical features.

As used herein, "microstructures" generally refer to structures having one or more dimensions of less than or equal to about 1000 microns, while "macrostructures" refer to structures having one or more dimensions of greater than about 1000 microns. As described below, microstructures and macrostructures are topographical features that typically have a height or depth extending perpendicularly to a plane of a curable adhesive layer, and at least one cross-sectional dimension as measured along a base of the feature parallel to or within the plane of the curable adhesive layer. The features may be both microstructured and macrostructured within the same feature. For example, on a surface having a plurality of features that form a pattern of adhesive ridges and open channels, an individual channel may have a crosssection resembling an equilateral triangle having sides measuring about 700 micrometers, while the length of that feature may be 10 centimeters or more.

As used herein, a "curable adhesive" refers to an adhesive composition that experiences further polymerization and/or crosslinking when exposed to an appropriate energy source, e.g, heat, actinic radiation (ultraviolet (UV) radiation), particulate radiation (gamma or electron beam radiation), or a combination thereof, to cure to a thermostable structural adhesive. A partially cured adhesive is one that has undergone a sufficient degree of polymerization and/or crosslinking to form an adhesive feature with sufficient integrity to withstand the force of lamination to another substrate while substantially maintaining the base shape of the feature during lamination and curing to a final article.

As used herein, a "structural adhesive" refers to an adhesive that, after curing, is thermoset or thermostable, and does not exhibit pressure-pressure sensitive adhesive properties, e.g., aggressive and permanent tackiness at room temperature, ability to adhere to a substrate with no more than light pressure, e.g., finger pressure, and sufficient ability to hold onto an adherend. After curing, the structural adhesive composition undergoes changes in one or more of the following properties: (1) an increase in structural rigidity, (2) a decrease in the ability to exhibit creep or flow, especially at elevated temperatures, e.g., over 100° C. and (3) an increase in resistance to instantaneous deformation under light pressure. A structural adhesive may also be defined as an adhesive that has a storage modulus (G') of greater than about $3 \times 10^5$ Pascals (measured at 10 radians/second at a temperature of about 20° C. to about 22° C.).

As used herein, a "structural hybrid adhesive" refers to an adhesive that has a pressure-sensitive adhesive (PSA) stage prior to curing, and is curable to a structural adhesive.

As used herein, a "pressure-sensitive adhesive" refers to an adhesive that exhibits permanent and aggressive tackiness at room temperature (e.g., between about 20° C. to about 30° C.), bonds to a surface upon application of light pressure, and is able to hold onto an adherend. An accepted quantitative description of a pressure sensitive adhesive is given by the Dahlquist criterion (as described in Handbook of Pressure Sensitive Adhesive Technology, Second Edition, D. Satas, ed., Van Nostrand Reinbold, New York, N.Y., 1989, pages 171-176), which indicates that materials having a storage modulus (G') of less than about $3 \times 10^5$ Pascals (measured at 10 radians/second at a temperature of about 20° C. to about 22° C.) typically have pressure sensitive adhesive properties while materials having a G' in excess of this value typically do not. Unlike a structural hybrid adhesive, a "pressure-sensitive adhesive" as used herein is not curable to a structural adhesive.

As used herein, a microstructured or macrostructured tool is a surface bearing the inverted image of the desired adhesive shape that is suitable for creating topographical features on the curable adhesive. A tool may be an embossed release liner (e.g., a silicone coated paper, a release material coated polymeric film, and the like), a casting such as an embossed polymeric slab or a metal casting, an embossing roller, an endless belt, and the like. For convenience, the following description will be described using the term microstructured liner as exemplary and not meant to be limiting.

The present invention provides adhesives articles having a structured surface profile, wherein the topography of the structured surface profile resists flow when exposed to heat, pressure, or a combination thereof. Exemplary embodiments of the present invention are described below, and in more detail in the following examples.

I. Curable Adhesive Articles

The curable adhesive articles of the present invention comprise at least one layer of curable adhesive, wherein at least a portion of at least one outermost surface of the curable adhesive layer contains topographical adhesive features, e.g, microstructures and/or macrostructures. The curable adhesive articles may comprise one or more layers described below.

A. Curable Adhesive Layer

The curable adhesive layer may be an outermost layer of the curable adhesive article or it may be sandwiched between two or more similar or dissimilar substrates. The curable adhesive layer provides unique properties to the curable adhesive articles of the present invention due to the presence of topographical features of the curable adhesive on at least a portion of an outermost surface of the curable adhesive layer. Unlike structured adhesive layers prior to the present invention, the curable adhesive layer comprises at least one outermost surface having (i) sufficient tackiness to bond to a substrate, and (ii) the ability to cure to a structural state so as to substantially retain an initial structured surface profile when exposed to temperatures greater than about 37.8° C. (100° F.). Typically, the curable adhesive layer does not exhibit pressure-sensitive adhesive properties after complete curing.

As used herein, the term "initial structured surface profile" refers to (1) a surface profile formed by the topographical features of the curable adhesive layer, or (2) a surface profile formed by the topographical features of the curable adhesive layer after the features have undergone a deformation due to lamination pressure, but still maintain much of their original profile. Such deformation may result in an increase in length of a given initial dimension to no more than 200% of the initial dimension in the base of a feature. In some applications it is desirable that deformation increases the feature dimension to no more than 150%. In some applications where higher precision or certain optical properties are desired, the deformation is an increase to no more than 125% and even more desirable, no more than 110%. As an illustration, a curable adhesive layer having tetrahedral pyramid shaped features having sides on the base measuring 200 microns may, upon lamination pressure, deform to base sides measuring 400 microns (200%), 300 microns (150%), or 220 microns (110%). Additionally, after at least partial curing, the adhesive features may resist instantaneous deformation under pressure.

1. Curable Adhesive Layer Structure

The curable adhesive layer of the present invention comprises a plurality of topographical features, e.g., adhesive masses in the form of microstructures, macrostructures, or a combination thereof, which form at least a portion of an outermost surface of the curable adhesive layer. In one embodiment of the present invention, a first outermost surface of the curable adhesive layer has a plurality of topographical features forming at least a portion of the first outermost surface. In a further embodiment of the present invention, first and second outermost surfaces of the curable adhesive layer have a plurality of topographical features forming at least a portion of the first and second outermost surfaces.

The shape and size of each individual topographical feature may vary as desired. Each individual topographical feature may be of a similar size and/or shape or may differ in size and/or shape from other individual topographical features on a given surface of the curable adhesive layer. Further, the individual topographical features may be uniformly, randomly, or non-uniformly distributed along a given surface of the curable adhesive layer.

In one exemplary embodiment of the present invention, the topographical features form a regular array or pattern and are separated by grooves or channels. Alternatively, the topographical features are ridges of adhesive that form an intersecting pattern having open areas between the ridges of adhesive. Regular arrays or patterns include, but are not limited to, rectilinear patterns, grid patterns, polar patterns, and crosshatch patterns. The patterns may be aligned with the direction of a carrier web (i.e., a release liner), or may be aligned at an angle with respect to the carrier web. The pattern of the topographical features may optionally reside on both major, opposing surfaces of the curable adhesive layer. The size and pattern of the topographical features may be varied from one area on a surface to another area on the same surface. When the pattern is on both major, opposing surfaces, the size and pattern of the topographical features may be the same or different from one surface to the other. The composition of the adhesive layer on each side may be the same or different. This ability to individually vary the size, shape, and pattern of the topographical features allows individual control of surface area of contact for each of the two surfaces to tailor the properties of the adhesive to two different interfaces for various end uses. Non-limiting examples of such end uses include bonding two different substrates or creating fluid egress (e.g., air, biological fluids, volatile components).

In some embodiments of the present invention, the pattern of topographical features defines substantially continuous open pathways or grooves that extend into the curable adhesive layer from an exposed surface. The pathways may either terminate at a peripheral portion of the curable adhesive layer or communicate with other pathways that terminate at a peripheral portion of the curable adhesive layer. When the curable adhesive layer is applied to a substrate, the pathways can allow egress of fluids trapped at an interface between the curable adhesive layer and a substrate. Alternatively, the topographical features define ridges that may form continuous open pathways or grooves or may form closed cells having edges formed by the ridges and are open in the central area of the cell. The ridges may be straight lines, sinusoidal lines, arcs, and the like.

In some cases, it may be desirable to have topographical features that do not create interference patterns with lights. In such cases, it is desirable to have topographical features that have overall dimensions of less than about 25% of the wavelength of light that comes into contact with the topographical features.

In a particular use, the pathways created by the pattern of topographical features desirably occupy a minimum volume per unit area of the curable adhesive layer to adequately permit fluid egress at the interface of the substrate and the curable adhesive layer. Desirably, the pattern of topographical features defines a volume of at least $1.0 \times 10^3$ $\mu m^3$ on any 500 $\mu m$ diameter circular area in a two-dimensional plane of the curable adhesive layer. More desirably, the pattern of microstructures and/or macrostructures defines a volume of above $1.0 \times 10^3$ $\mu m^3$ to about $1 \times 10^7$ $\mu m^3$ on any 500 $\mu m$ diameter circular area of the curable adhesive layer.

The shapes of the features in the curable adhesive layer may vary widely depending on the desired end use. Protrusions (features, e.g., microstructures and/or macrostructures extending above the plane of the curable adhesive layer or release liner) and depressions (features, e.g., microstructures and/or macrostructures extending below the plane of the curable adhesive layer or release liner) may be used, and the microstructures and/or macrostructures may be continuous to form grooves in the curable adhesive layer. The features have cross-sectional dimensions at their bases that may be of any shape that include, but are not limited to, circular, triangular, quadrangular, pentagonal, hexagonal, and the like. The features can be hemispheres, right pyramids, trigonal pyramids, square pyramids, quadrangular pyramids, hexagons, and grooves, e.g., "V" groove, "U" groove, and the like. Additionally, the adhesive features may be formed by intersecting rows of solid adhesive to form an adhesive grid having open areas within the grids, wherein the open areas have base shapes listed above. Further, the adhesive features may be linear ridges of adhesive separated by channels or grooves. The features also have a height in a direction that is perpendicular to the plane of the bases. The sides of the features have an angle α that can vary from greater than 0° to 90°.

An exemplary curable adhesive layer 122 including structures 150 is shown in FIG. 1. The dimensions of the microstructures and/or macrostructures may vary widely depending on the rheology of the curable adhesive layer and the application conditions. The pitch P, i.e., the distance from one point on a topographical feature 150 to the same point on the next adjacent feature 150 may vary from about 5 μm to about 2500 μm, and in some cases, from about 25 μm to about 1300 μm. The height h of each feature 150 from a plane of the curable adhesive layer 122 may vary from about 3 μm to about 2500 μm, and in some cases, from about 10 μm to about 30 μm. The width of feature 150 at its base $W_1$ is typically less than about 200 μm. The distance $W_2$ across the top 152 of the feature 150 is typically from about 0 μm to about 300 μm. The distance $W_3$ between the bases of the feature 150 is typically from about 0 μm to about 300 μm. The feature 150 has at least one sidewall 132 that makes an angle α with respect to a plane of the surface of the adhesive layer 122. The angle α may be selected from an angle greater than 0° and less than 90°. In some instances the angle α may desirably be less than about 50°, as measured with respect to the plane of the surface of the adhesive layer 122. Such a curable adhesive layer may be suitable for bonding between two substrates where fluid egress in the space between the substrates is desirable.

Although specific exemplary dimensions for suitable topographical features are detailed in FIG. 1 described above, it should be understood that there are no limitations on the size, shape, and/or dimensions of each individual topographical feature present on an outer surface of the curable adhesive layer of the present invention.

Figure 2:
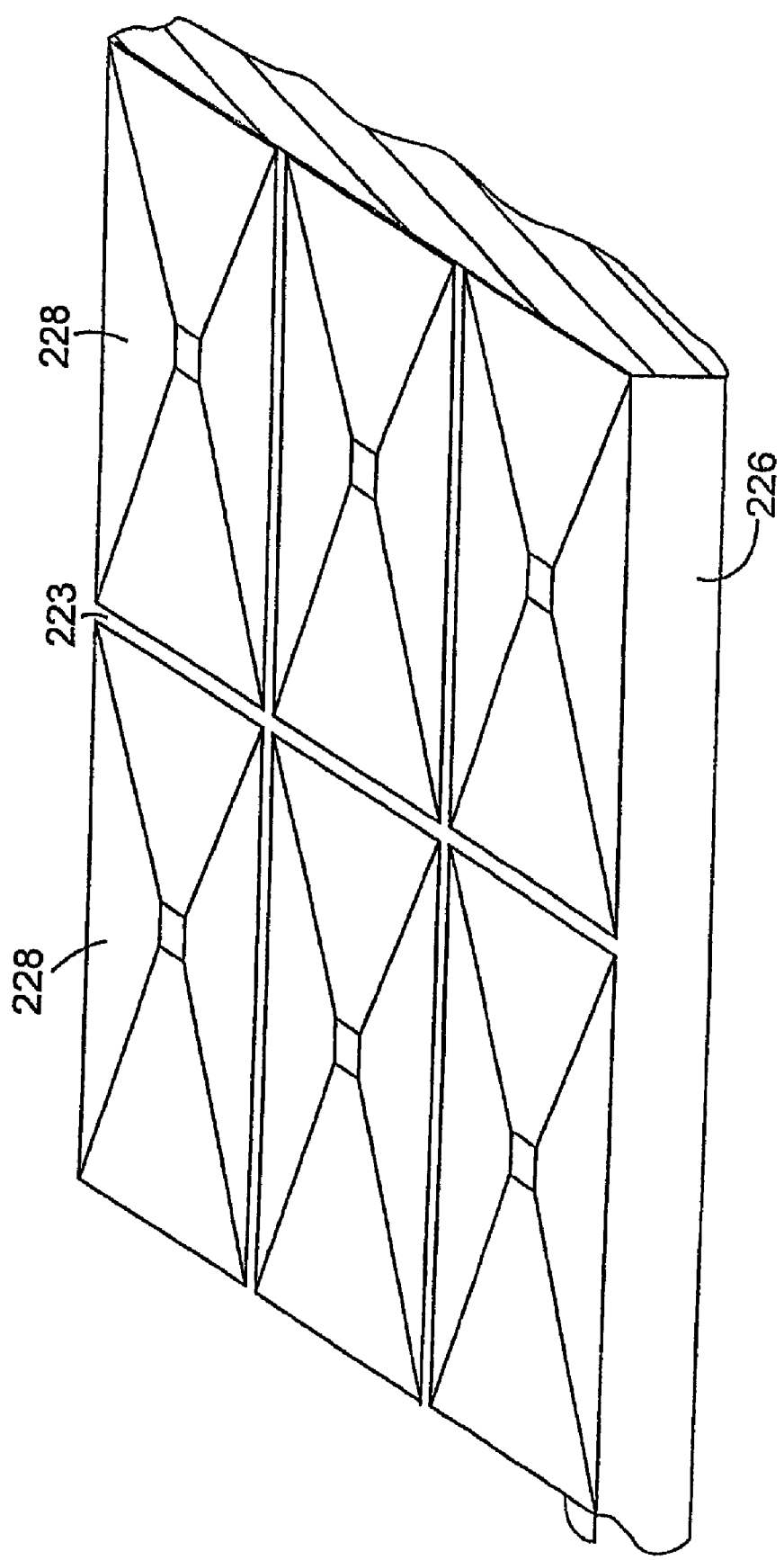
FIG. 2 is a perspective view of an exemplary release liner suitable for use in the present invention for forming a curable adhesive layer.
Figure 3:
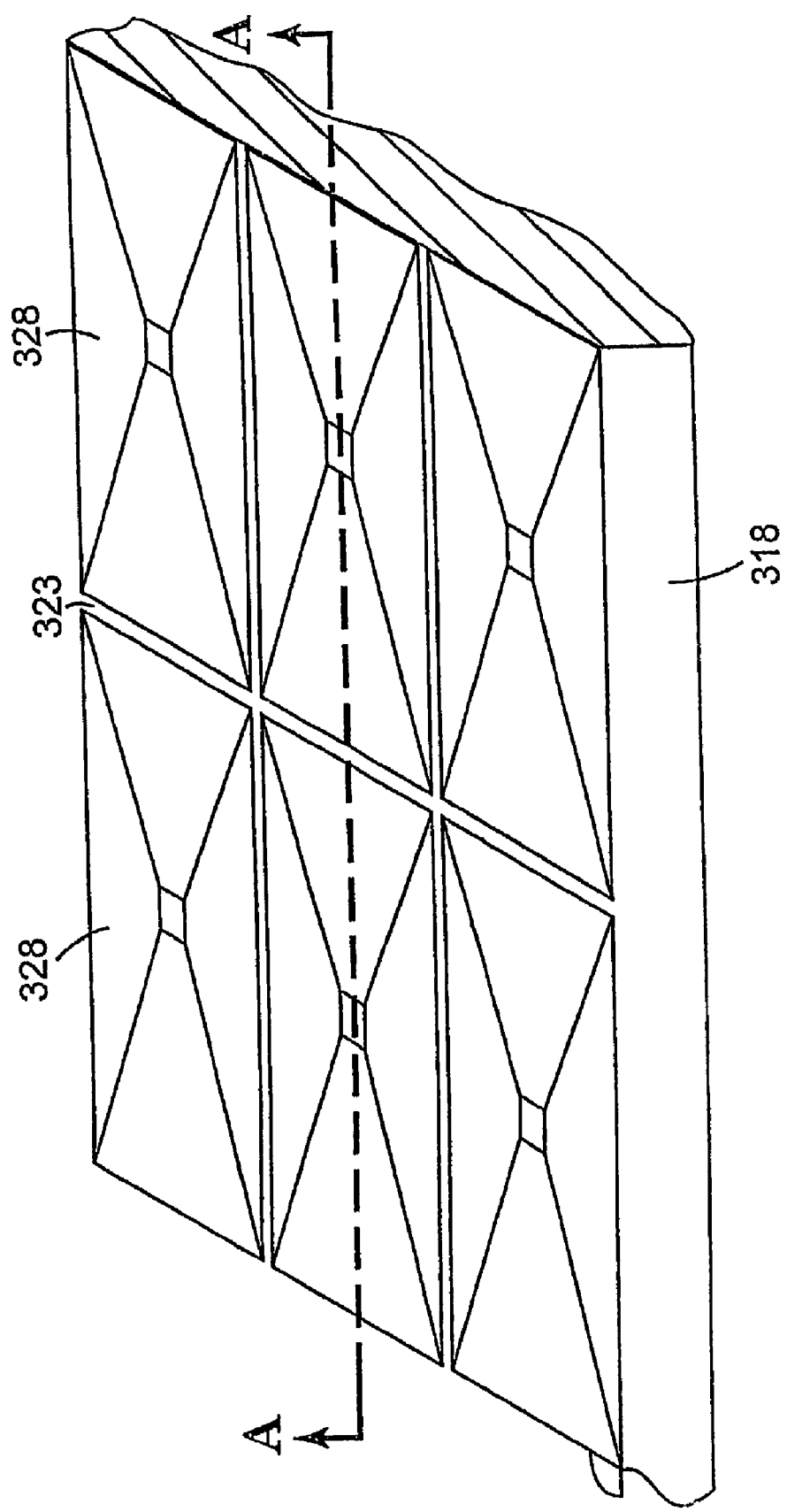
FIG. 3 is a perspective view of an exemplary curable adhesive layer formed on the exemplary release liner of FIG. 2.

An exemplary structured release liner used to form an exemplary curable adhesive layer of the present invention is shown in FIG. 2. The curable adhesive layer may be coated and/or laminated on the embossed release liner 226 shown in FIG. 2, which includes pyramidal depressions extending below a plane 223 of the release liner. When the release liner 226 is removed, the resulting curable adhesive layer 318, which is shown in FIG. 3, includes pyramidal protrusions 328 corresponding to the pyramidal depressions 228 in the release liner 226. The pyramidal protrusions 328 extend upward from a plane 323 of curable adhesive layer 318, which forms an array of substantially continuous channels in curable adhesive layer 318.

Figure 4A:
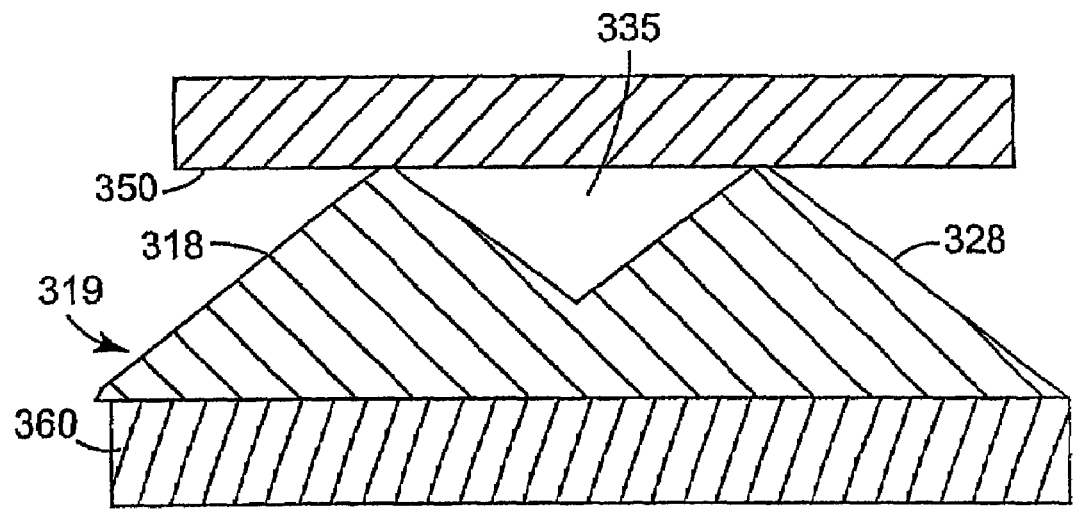
FIG. 4A is a cross-sectional view of an exemplary curable adhesive layer as it is initially contacted with a substrate.
Figure 4B:
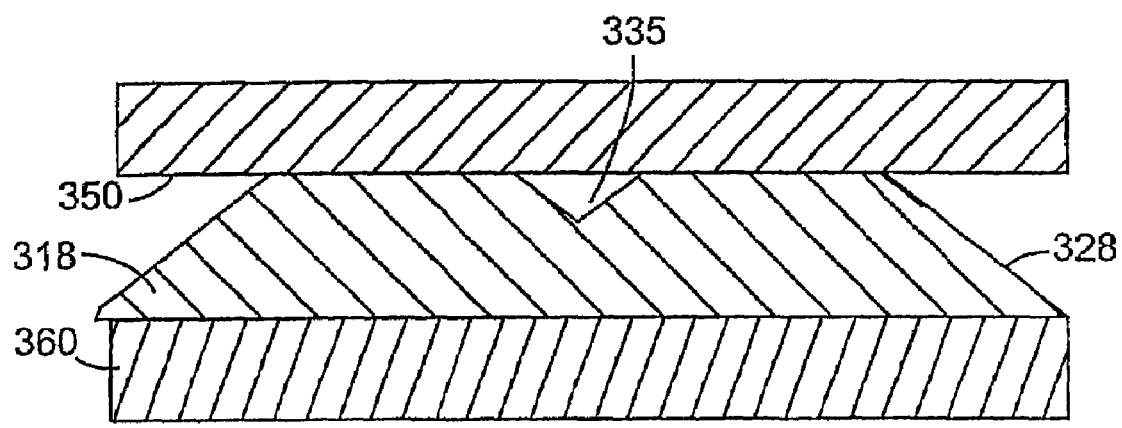
FIG. 4B is a cross-sectional view of an exemplary graphic article after adequate adhesion to a substrate has been achieved.

Curable adhesive layer 318 may be bonded to one or more substrates, as described in more detail below, and as shown in FIGS. 4A and 4B. Referring to FIGS. 4A and 4B, a first laminate includes a substrate 360 and curable adhesive layer 318 with a structured surface 319. Once release liner 126 (not shown in FIGS. 4A and 4B) is removed, the exposed surface 319 of curable adhesive layer 318 may be contacted with a second substrate 350 to form a second laminate. Substrates 350 and 360 may be rigid or flexible. Each of substrates 350 and 360 may be independently surface modified with patterns and grooves if desired. The surface topography of substrates 350 and 360 is completely independent of the structured pattern in curable adhesive layer 318.

2. Curable Adhesive Layer Physical Properties

The curable adhesive layers of the present invention possess at least the following desirable physical properties.

a. Adhesive Tackiness

The curable adhesive layers of the present invention are formulated to possess sufficient tackiness to bond to a substrate. The selection of the appropriate adhesive for a given substrate is generally known to those of ordinary skill in the art to provide the appropriate amount of tack desired. The amount of tack that is desirable can vary depending upon the application. In some cases, a very aggressively tacky adhesive may be desirable while in other cases it is desirable to have low tack adhesives. The tack is desirably sufficient to bond to the substrate, or to bond two substrates together, until the adhesive is cured and a structural bond is formed.

When the placement of the curable adhesive layer on a given substrate is particularly critical, it may be useful to include other structures or materials on the topographical features to limit initial contact of the adhesive structures to the substrate. Additional structures may be unnecessary if the topographical features of the curable adhesive are such that there is limited initial contact between the adhesive features and the substrate. For example, when the features are pyramidal, the tips of the pyramids allow limited contact so that the adhesive layer does not build a strong bond and may be removed and repositioned as needed. When the adhesive has been properly positioned, pressure is applied to laminate the curable adhesive layer between two substrates and the tips of the pyramids can flatten sufficiently to hold the substrates together while retaining the shape of the pyramids, e.g. essentially forming a truncated pyramid. When the bonding surface of the features is flat, e.g., for a truncated pyramid or a flat hexagon, other additional materials may be added to help control the initial bond strength so the adhesive can be positioned or repositioned. Other additional materials that may be used to control initial adhesion are non-adhesive beads, e.g., glass or polymeric beads, non-adhesive bubbles; printed dots of non-adhesive materials on the adhesive surface, slightly tacky or non-tacky pegs. The additional materials may be present (i) on an outer surface of the curable adhesive layer, which forms the topographical features of the adhesive layer, (ii) on an outer surface of the curable adhesive layer other than the portion, which forms the topographical features of the adhesive layer, or (iii) a combination thereof. After the adhesive has been positioned and laminated, it can be cured to form a structural bond.

b. Ability To Be Cured To A Structural State Which Retains Its Shape and Resists Flow At Elevated Temperatures The curable adhesive layer of the present invention cures to a structural state so as to substantially retain an initial structured surface profile when exposed to temperatures greater than about 37.8° C. (100° F.). The curable adhesive layer of the present invention may be at least partially cured to produce a partially cured curable adhesive layer, which further resists macroscopic flow and substantially retains its structured shape (i.e., topographical features) when exposed to temperatures greater than about 37.8° C. (100° F.). An increase in temperature above 37.8° C. (100° F.) may lead to further polymerization and/or crosslinking of the curable adhesive layer adhesive composition, but does not result in a loss of topographical features as found in conventional pressure-sensitive adhesives. The partially cured adhesive may undergo microscopic flow by wetting out onto the surface of a substrate to which it is adhered, and/or deformation from lamination. The fully cured topographical features of the curable adhesive layer may be exposed to temperatures up to at least about 32° C. (90° F.) without any loss in its structured shape. Furthermore, the cured adhesives will not undergo a permanent deformation under pressure.

It should be understood that the ability of the curable adhesive layer of the present invention to resist creep and retain its structured shape when exposed to temperatures greater than about 37.8° C. (100° F.) is primarily due to the polymerizable and/or crosslinkable components within the at least partially cured adhesive layer. Certain fillers may add rigidity or modulus to the partially cured adhesive layer, especially if there are chemical or physical interactions between the fillers and the adhesive material. However, the at least partially cured adhesive layer of the present invention resists flow and retains its structured shape when exposed to temperatures greater than about 37.8° C. (100° F.) even when the curable adhesive layer is free of fillers and other solid additives.

3. Curable Adhesive Layer Components

The curable adhesive layers of the present invention may comprise any combination of components that provide a curable adhesive layer having the above-described physical properties. A number of exemplary components that provide the above-noted properties are described below.

a. Epoxies

In one exemplary embodiment of the present invention, the curable adhesive layer comprises one or more epoxies. Suitable epoxy materials include, but are not limited to, cationically-polymerizable monomers, a large variety of which are well-known in the chemical and adhesive arts. See, for example, U.S. Pat. No. 5,897,727, the entire disclosure of which is incorporated herein by reference. General examples of useful epoxy component include epoxy monomers and macromers, multi-functional epoxy crosslinkers, and aliphatic and cyclic epoxy monomers and macromers. The epoxy component may include a functionality that can be reacted directly or through a crosslinker or other linking chemical material to another component within the curable adhesive composition, such as an acrylate component, to form an inter-reacted interpenetrating polymer network (IPN). Preferred epoxies can be selected, in properties including bond strength, integrity, and stability.

Suitable epoxies for use in the present invention include, but are not limited to, epoxies disclosed in U.S. Pat. Nos. 3,117,099; 3,018,262; 5,252,694 and 5,897,727, the disclosures of all of which are incorporated by reference in their entirety.

A wide variety of commercial epoxides are available and listed in "Handbook of Epoxy Resins" by Lee and Neville, McGraw Hill Book Company, New York (1967) and in "Epoxy Resin Technology" by P. F. Bruins, John Wiley & Sons, New York (1968), and in "Epoxy Resins: Chemistry and Technology, $2^{nd}$ Edition" by C. A. May, Ed., Marcel Dekker, Inc. New York (1988). Suitable commercially available epoxides for use in the present invention include, but are not limited to, epoxies available under the trade designations "EPON" available from Resolution Performance Productions, Houston, Tex.; "DER", available from Dow Chemical Company,. Midland, Mich.); "ARALDITE", available from Vantico, Brewster, N.Y.; "TACTIX", available from Vantico, Brewster, N.Y.; "OXIRON 2001" available from FMC Corp., Philadelphia, Pa.; or "Poly bd" from Elf Atochem, Philadelphia, Pa.; and "3M Scotch-Weld Structural Adhesive Film" including those having the following "AF" designations: "AF 42", "AF 111", "AF 126-2", "AF 163-2", "AF 3109-2", "AF 191", "AF 2635", "AF 3002", "AF 3024", and "AF 3030FST".

The curable adhesive layer may comprise one or more epoxy resins in any amount as long as the resulting curable adhesive layer adhesive composition possesses the above desired properties. In one desired embodiment of the present invention, the curable adhesive layer comprises one or more epoxy resins in an amount of up to about 90 weight percent, based on the total weight of the curable adhesive layer adhesive composition. In a further desired embodiment of the present invention, the curable adhesive layer comprises one or more epoxy resins in an amount of from about 20 weight percent to about 80 weight percent, based on the total weight of the curable adhesive layer adhesive composition.

b. Polyacrylates

The curable adhesive layer of the present invention may further comprise one or more polyacrylate components. As used herein, the term "polyacrylate component" refers to a polymeric component generally prepared by polymerizing (meth)acrylate monomers. Acrylate and methacrylate monomers are referred to collectively herein as "(meth)acrylate" monomers. Polymers prepared from one or more of such (meth)acrylate monomers, optionally with any one or more of a variety of other useful monomers, will be referred to collectively as "polyacrylates." The polymers can be homopolymers or copolymers, optionally in combination with other, non-(meth)acrylate, e.g., vinyl-unsaturated, monomers. Such polyacrylate polymers and their monomers are well-known in the polymer and adhesive arts.

A variety of different (meth)acrylate monomers and polyacrylates may be used in the present invention. Desirably, the polyacrylate contains one or more reactive functional groups for bonding directly or indirectly to an epoxy component, such as those described above, to form an IPN. These reactive functional groups may be any known reactive groups, such as hydroxy (—OH) or acidic (e.g., carboxylic, —COOH) reactive groups. Such groups can be included in a polyacrylate, for example, by including an appropriate monomer in preparing the polyacrylate, such as an acrylic acid monomer. Alternatively, this inter-reaction between polyacrylate and epoxy can be achieved through the use of bi-or multi-functional monomers such as epoxy acrylates in conjunction with grafting groups that can react with the polyacrylate. Still another example of producing an inter-reacted IPN is by including an epoxy-functional group on the polyacrylate backbone. An all-epoxy-functional system could be cured with cationic initiator without need for other initiators such as free-radical initiators.

Specific examples of polyacrylate polymers suitable for use in the present invention include, but are not limited to, polymers prepared from free-radically polymerizable acrylate monomers or oligomers such as described in U.S. Pat. Nos. 5,252,694, and 5,086,088; and polyacrylates disclosed in U.S. patent application Ser. No. 10/005,669, entitled "HYBRID ADHESIVES, ARTICLES, AND METHODS", filed on Nov. 2, 2001, and U.S. patent application Ser. No. 10/331,374, entitled "CURABLE PRESSURE-SENSITIVE ADHESIVE COMPOSITIONS" filed on Dec. 30, 2002, the disclosures of all of which are incorporated by reference in their entirety.

Examples of commercially available (meth)acrylate resins suitable for use in the present invention include, but are not limited to, curable acrylate resins sold under the trade designations HYTEMP™ and NIPOL™, both of which are available from Zeon Chemicals Company, Inc., Louisville, Ky. The HYTEMP™ and NIPOL™ series of polyacrylates includes polyacrylates such as HYTEMP™ 4051, and 4051EP, and NIPOL™ AR-31 (Zeon Chemicals Company, Inc., Louisville, Ky.). Other commercially available acrylate resins suitable for use in the present invention include, but are not limited to, the VAMAC™ series of ethylene/acrylic elastomers, such as VAMAC™ G and VAMAC™ D (DuPont Packaging and Industrial Polymers, Wilmington, Del.); the LOTADER™ and LOTARYL™ (Atofina Chemicals Inc., Philadelphia, Pa.) series of acrylic elastomers and ethylene-acrylic ester copolymers, such as LOTADER™ 4700 and LOTARYL™ 35BA320, 35MA03 and 35MA05 (Atofina Chemicals Inc., Philadelphia, Pa.); the EUROPRENE™ series of acrylic rubber, such as EUROPRENE™ AR53 EP, AR 156 LTR, EUROPRENE™ C, L and R (EniChem America Inc., Houston, Tex.).

The curable adhesive layer may comprise one or more (meth)acrylate resins in any amount as long as the resulting curable adhesive layer adhesive composition possesses the above described properties. In one desired embodiment of the present invention, the curable adhesive layer comprises one or more (meth)acrylate resins in an amount of up to about 90 weight percent, based on the total weight of the curable adhesive layer adhesive composition. In a further embodiment of the present invention, the curable adhesive layer comprises one or more (meth)acrylate resins in an amount of from about 20 weight percent to about 80 weight percent, based on the total weight of the curable adhesive layer adhesive composition.

c. Ethylene Vinyl Acetate Copolymer

In other exemplary embodiments of the present invention, the curable adhesive layer contains one or more thermoplastic ethylene-vinyl acetate copolymer resins. In one desired embodiment of the present invention, the curable adhesive layer contains one or more thermoplastic ethylene-vinyl acetate copolymer resins in combination with one or more expoxies described above. Suitable thermoplastic ethylene-vinyl acetate copolymer resins include, but are not limited to, thermoplastic ethylene-vinyl acetate copolymer resins disclosed in U.S. patent application Ser. No. 09/823,189, entitled "STRUCTURAL BONDING TAPES AND ARTICLES CONTAINING THE SAME", filed on Mar. 29, 2001, the disclosure of which is incorporated by reference in its entirety.

Examples of commercially available ethylene-vinyl acetate copolymers, which may be used in the present invention include, but are not limited to, ELVAX™ 210, 250, 260, and 265 (E. I. Du Pont de Nemours and Co., Wilmington, Del.) and AT Plastics 2820M EVA copolymer (AT Plastics, Inc., Brampton, Ontario, Canada) (28 weight percent vinyl acetate); ELVAX™ 150 (E. I. Du Pont de Nemours and Co., Wilmington, Del.) and AT Plastics 3325M EVA copolymer (AT Plastics, Inc., Brampton, Ontario, Canada) (33 weight percent vinyl acetate); ELVAX™ 40W (E. I. Du Pont de Nemours and Co., Wilmington, Del.), LEVAPREN™ 400 (Bayer Corp., Pittsburgh, Pa.), and AT Plastics 4030M (AT Plastics, Inc., Brampton, Ontario, Canada) (40 weight percent vinyl acetate); LEVAPREN™ 450, 452, and 456(Bayer Corp., Pittsburgh, Pa.) (45 weight percent vinyl acetate); LEVAPREN™ 500HV (Bayer Corp., Pittsburgh, Pa.) (50 weight percent vinyl acetate); LEVAPREN™ 600HV (Bayer Corp., Pittsburgh, Pa.) (60 weight percent vinyl acetate); LEVAPREN™ 700HV (Bayer Corp., Pittsburgh, Pa.) (70 weight percent vinyl acetate); and LEVAPREN™ KA 8479 (Bayer Corp., Pittsburgh, Pa.) (80 weight percent vinyl acetate).

The curable adhesive layer of the present invention may comprise one or more ethylene-vinyl acetate copolymer resins in any amount as long as the resulting curable adhesive layer adhesive composition possesses the above described properties. In one desired embodiment of the present invention, the curable adhesive layer comprises one or more ethylene-vinyl acetate copolymer resins in an amount of up to about 40 weight percent, based on the total weight of the curable adhesive layer adhesive composition. In a further embodiment of the present invention, the curable adhesive layer comprises one or more ethylene-vinyl acetate copolymer resins in an amount of from about 20 weight percent to about 35 weight percent, based on the total weight of the curable adhesive layer adhesive composition.

d. Thermoplastic Polyesters

In another exemplary embodiment of the present invention, the curable adhesive layer contains one or more thermoplastic polyesters. In one desired embodiment of the present invention, the curable adhesive layer contains one or more thermoplastic polyesters in combination with one or more epoxies described above. Suitable polyester components include, but are not limited to, amorphous and branched polyesters having a glass transition temperature ($T_g$) of not more than about $10°$ C., and desirably not more than about $5°$ C.

The amorphous and branched polyester component used in the present invention may be differentiated from crystalline polyesters in that the amorphous and branched polyester does not display a measurable crystalline melting behavior when an 8gram sample is subjected to a Differential Scanning Calorimetry (DSC) scan at a rate of $20°$ C. per minute from $-60°$ C. to $200°$ C. The DSC measurement is conveniently performed using commercially available DSC equipment such as a DSC7 differential scanning calorimeter from Perkin Elmer, Norwalk, Conn.

While not displaying a melting behavior, the amorphous and branched polyester, when being subjected to a DSC scan, displays a glass transition temperature. The temperature of glass transition of the amorphous and branched polyester is desirably less than about $10°$ C., and more desirably in the range of about $-20°$ C. to about $5°$ C., and even more desirably between about $-10°$ C. and about $5°$ C.

Examples of commercially available polyesters, which may be used in the present invention include, but are not limited to, polyesters sold under the trade designation DYNAPOL and commercially available from DeGussa (Parsippany, N.J.).

Suitable thermoplastic polyesters include, but are not limited to, thermoplastic polyesters disclosed in U.S. patent application Ser. No. 09/823,189, entitled "STRUCTURAL BONDING TAPES AND ARTICLES CONTAINING THE SAME", filed on Mar. 29, 2001, the disclosure of which is incorporated by reference in its entirety.

The curable adhesive layer may comprise one or more thermoplastic polyesters in any amount as long as the resulting curable adhesive layer adhesive composition possesses the above described properties. In one desired embodiment of the present invention, the curable adhesive layer comprises one or more thermoplastic polyesters in an amount of up to about 50 weight percent, based on the total weight of the curable adhesive layer adhesive composition. In a further embodiment of the present invention, the curable adhesive layer comprises one or more thermoplastic polyesters in an amount of from about 20 weight percent to about 50 weight percent, based on the total weight of the curable adhesive layer adhesive composition.

e. Urethane Materials

In another exemplary embodiment of the present invention, the curable adhesive layer contains one or more urethane materials. As used herein, the term "urethane materials"

refers to polymers and prepolymers made from the reaction product of a compound containing at least two isocyanate groups (—N=C=O), referred to herein as "isocyanates", and a compound containing at least two active-hydrogen containing groups. Examples of active-hydrogen containing groups include primary alcohols, secondary alcohols, phenols and water; primary and secondary amines (which react with the isocyanate to form a urea linkage); and silanol-containing materials. A wide variety of isocyanate-terminated materials and appropriate co-reactants are well-known, and many are commercially available (see for example, Gunter Oertel, "Polyurethane Handbook", Hanser Publishers, Munich (1985)).

In one desired embodiment of the present invention, the curable adhesive layer contains one or more urethane materials in combination with one or more epoxies described above and/or one or more polyacrylates described above. Suitable urethane materials for use in the present invention include, but are not limited to, urethane materials disclosed in U.S. patent application Ser. No. 10/157,260, entitled "SEGMENTED CURABLE TRANSFER TAPES", filed on May 28, 2002, the disclosure of which is incorporated by reference in its entirety.

The curable adhesive layer may comprise one or more urethane materials in any amount as long as the resulting curable adhesive layer adhesive composition possesses the above described properties. In one desired embodiment of the present invention, the curable adhesive layer comprises one or more urethane materials in an amount of up to about 50 weight percent, based on the total weight of the curable adhesive layer adhesive composition. In a further embodiment of the present invention, the curable adhesive layer comprises one or more urethane materials in an amount of from about 20 weight percent to about 50 weight percent, based on the total weight of the curable adhesive layer adhesive composition.

f. Mono-and Multi-Acrylate Oligomers

In another exemplary embodiment of the present invention, the curable adhesive layer contains one or more mono- and/or multi-acrylate oligomers. As used herein, the term "mono-acrylate oligomer" refers to an oligomer having only one acrylate functional group, while the term "multi-acrylate oligomer" refers to an oligomer having at least two acrylate functional groups. In one desired embodiment of the present invention, the curable adhesive layer contains one or more mono- and/or multi-acrylate oligomers in combination with one or more polyacrylates described above. In this desired embodiment, the mono-acrylate can provide the backbone for the polymer, which forms upon blending it with an acrylate copolymer and a multi-acrylate oligomer as described herein. The acrylate functionalities can be terminal groups, or they can be grafted onto a site within the oligomer chain. Upon blending with the other components of the composition, the multi-acrylate oligomer provides the crosslinks or branches needed to form a network with the mono-acrylate oligomer backbone.

Suitable mono- and multi-acrylate oligomers for use in the present invention include, but are not limited to, mono- and multi-acrylate oligomers disclosed in U.S. patent application Ser. No. 10/331,374, entitled "CURABLE PRESSURE SENSITIVE ADHESIVE COMPOSITIONS", filed on Dec. 30, 2002, the disclosure of which is incorporated by reference in its entirety.

The curable adhesive layer may comprise one or more mono- and multi-acrylate oligomers in any amount as long as the resulting curable adhesive layer adhesive composition possesses the above described properties. In one desired embodiment of the present invention, the curable adhesive layer comprises one or more mono- and multi-acrylate oligomers in an amount of up to about 60 weight percent, based on the total weight of the curable adhesive layer adhesive composition. In a further embodiment of the present invention, the curable adhesive layer comprises one or more mono- and multi-acrylate oligomers in an amount of from about 20 weight percent to about 60 weight percent, based on the total weight of the curable adhesive layer adhesive composition.

g. Cyanate Ester Materials

In yet another exemplary embodiment of the present invention, the curable adhesive layer contains one or more cyanate ester materials. In one desired embodiment of the present invention, the curable adhesive layer contains one or more cyanate ester materials in combination with one or more epoxies described above and/or one or more polyacrylates described above. Suitable cyanate ester materials (monomers and oligomers) are those having two or more —O—C≡N functional groups, including those described in U.S. Pat. Nos. 5,143,785; 3,962,184; 4,022,755; 4,026,913; 3,595,900; 4,740,584; 4,709,008; 4,528,366; 3,733,349; 4,195,132; and 4,116,946, the disclosures of all of which are incorporated by reference in their entirety.

When present in the curable adhesive layer, the one or more cyanate ester materials are present in an amount of up to about 50 weight percent, based on the total weight of the curable adhesive layer adhesive composition. More desirably, when present, the one or more cyanate ester materials are present in an amount of from about 20 weight percent to about 50 weight percent, based on the total weight of the curable adhesive layer adhesive composition. Even more desirably, when present, the one or more cyanate ester materials are present in an amount of from about 30 weight percent to about 40 weight percent, based on the total weight of the curable adhesive layer adhesive composition.

h. Bismaleimide Materials

The curable adhesive layer may further contain one or more bismaleimide materials. Examples of suitable bismaleimide materials, also known as N,N'-bismaleimide monomers and prepolymers, include, but are not limited to, the N,N'-bismaleimides of 1,2-ethanediamine, 1,6-hexanediamine, trimethyl-1,6-hexanediamine, 1,4-benzenediamine, 4,4'-methylene-bis(benzenamine), 2-methyl-1,4-benzenediamine, 3,3'-methylene-bis(benzenamine), 3,3'-sulfonyl-bis(benzenamine), 4,4'-sulfonyl-bis(benzenamine), 3,3'-oxy-bis(benzenamine), 4,4'-oxy-bis(benzenamine), 4,4'-methylene-bis(cyclohexanamine), 1,3-benzenedimethanamine, 1,4-benzenedimethanamine, and 4,4'-cyclohexane-bis(benzenamine) and mixtures thereof. Other N,N'-bismaleimides and their process of preparation are described in U.S. Pat. Nos. 3,562,223; 3,627,780; 3,839,358; and 4,468,497, all of which are incorporated herein by reference.

Representative examples of commercially available bismaleimide materials include the series of materials available from Resolution Performance Productions, Houston, Tex. under the trade designation "COMPIMIDE", such as 4,4'-bismaleimidodiphenyl methane ("COMPIMIDE Resin MDAB"), and 2,4'-bismaleimidotoluene ("COMPIMIDE Resin TDAB"), from Dexter/Quantum, San Diego, Calif. under the trade designation "Q-Bond".

When present in the curable adhesive layer, the one or more bismaleimide materials are present in an amount of up to about 50 weight percent, based on the total weight of the curable adhesive layer adhesive composition. More desirably, when present, the one or more bismaleimide materials are present in an amount of from about 20 weight percent to about 50 weight percent, based on the total weight of the curable adhesive layer adhesive composition. Even more desirably, when present, the one or more bismaleimide materials are present in an amount of from about 30 weight percent to about 40 weight percent, based on the total weight of the curable adhesive layer adhesive composition.

i. Curatives

The curable adhesive layer may further contain one or more curatives or curing agents. The term "curative" or "curing agent" is used broadly to include not only those materials that are conventionally regarded as curatives but also those materials that catalyze or accelerate the reaction of the curable material, as well as, those materials that may act as both curative and catalyst or accelerator. It is also possible to use two or more curatives in combination. The curative may be a heat-activated curative or a light-activated curative.

Suitable curatives for use in the present invention include, but are not limited to, curatives disclosed in U.S. Pat. Nos. 4,503,211; 4,751,138; 4,868,28; and 4,985,340; and European Patent Applications 306,161; 306,162; and 0344911, the disclosures of all of which are incorporated by reference in their entirety. In one exemplary embodiment of the present invention, the curable adhesive layer comprises one or more curatives selected from amines.

Suitable commercially available initiators include, but are not limited to, aromatic sulfonium complex salts FX-512™ (Minnesota Mining and Manufacturing Company, St. Paul, Minn.), CD-1012™ and CD-1010™ (Sartomer, Exton, Pa.); UVOX™ UVI-6974, an aromatic sulfonium complex salt (Union Carbide Corp., Danbury, Conn.); IRGACURE™ 261, a cationic organometallic complex salt (Ciba Specialty Chemicals, Basel, Switzerland); and RHODORSIL™ products, such as RHODORSIL 2074™ (Rhodia Inc., Cranbury, N.J.).

The curable adhesive layer typically comprises one or more curatives in an amount of up to about 10 weight percent, based on the total weight of the curable adhesive layer adhesive composition.

j. Additives

Various additives or other ingredients may be added to the curable adhesive layer to impart or modify particular characteristics of the ultimate adhesive composition. The additives may be present in any amount as long as the amount does not adversely interfere with the desired properties of the curable adhesive layer. The curable adhesive layer typically comprises one or more additives in an amount of up to about 10 weight percent, based on the total weight of the curable adhesive layer adhesive composition. Exemplary additives include, but are not limited to, tackifiers, plasticizers, fillers, antioxidants, stabilizers, pigments, diffusing materials, fibers, filaments, silicas, treated silicas, and carbon black.

B. Other Layers

In addition to the curable adhesive layer described above, the curable adhesive articles of the present invention may include one or more additional layers on either side of the curable adhesive layer. The one or more additional layers may each independently be temporarily or permanently attached to a layer of the curable adhesive article. Suitable additional layers are described below.

1. Additional Adhesive Layers

The curable adhesive articles of the present invention may include one or more additional adhesive layers on either side of the curable adhesive layer. The one or more additional adhesive layers may be any suitable adhesive known in the art. Desirably, the additional adhesive layer, when present, is an adhesive, which is activatable by pressure, heat or a combination thereof. Suitable additional adhesive layer compositions include, but are not limited to, adhesive compositions based on (meth)acrylates, rubber/resins, epoxies, urethanes or combinations thereof. The additional adhesive layer may be applied to an outer surface of the curable adhesive layer by solution, water-based or hot-melt coating methods. The additional adhesive layer may include hot melt coated formulations, transfer-coated formulations, solvent-coated formulations, and latex-coated formulations, as well as, laminating, thermally-activated, and water-activated adhesives and bonding agents. More desirably, the additional adhesive layer comprises a pressure sensitive adhesive.

Examples of suitable pressure sensitive adhesives include, but are not limited to, adhesives based on general compositions of poly(meth)acrylate; polyvinyl ether; diene rubber such as natural rubber, polyisoprene, and polybutadiene; polyisobutylene; polychloroprene; butyl rubber; butadiene-acrylonitrile polymer; thermoplastic elastomer; block copolymers such as styrene-isoprene and styrene-isoprene-styrene (SIS) block copolymers, ethylene-propylene-diene polymers, and styrene-butadiene polymers; poly-alpha-olefin; amorphous polyolefin; silicone; ethylene-containing copolymer such as ethylene vinyl acetate, ethylacrylate, and ethyl methacrylate; polyurethane; polyamide; epoxy; polyvinylpyrrolidone and vinylpyrrolidone copolymers; polyesters; and mixtures or blends (continuous or discontinuous phases) of the above. As discussed above, the additional adhesive layer adhesive composition may contain additives including, but not limited to, tackifiers, plasticizers, fillers, antioxidants, stabilizers, pigments, diffusing materials, fibers, and filaments.

In one embodiment of the present invention, the curable adhesive article comprises one curable adhesive layer in combination with at least one additional adhesive layer, wherein the at least one additional adhesive layer is present on an outer surface of the curable adhesive layer in the form of a continuous or discontinuous coating. When the additional adhesive layer is present as a discontinuous coating, the additional adhesive layer may be present as dots, squares, triangles, lines, or any other configuration along the outer surface of the curable adhesive layer.

2. Release Liners

In addition to the curable adhesive layer and the additional adhesive layers described above, the curable adhesive articles of the present invention may include one or more release liners to protect an outer surface of an adhesive layer and/or provide topographical features to a surface of the curable adhesive layer. Release liners are well-known in the art, and any known release liner may be used in the present invention. Typically, the release liner comprises a film or paper substrate coated with a release material.

Commercially available release liners suitable for use in the present invention include, but are not limited to, silicone coated papers, and silicone coated films, such as polyester films. Examples of suitable release liners include, but are not limited to, release liners sold under the trade designation AKROSIL™ available from Akrosil Europe (Huerlen, Netherlands) and International Paper (Menasha, Wis.); and release liners available from Daubert Coated Products, Inc. (Dixon, Ill.). Desirably, the release liner comprises AKROSIL™ Paper Liner ZG-3223 (Akrosil Europe, Huerlen, Netherlands) or AKROSIL™ Paper Liner SBL 60 SC SILOX F1U/F4B (International Paper, Menasha, Wis.). More desirably, the release liner comprises AKROSIL™ Paper Liner ZG-3223 (Akrosil Europe, Huerlen, Netherlands).

To impart topographical features into the curable adhesive layer, structured release liners may be used. As used herein, the term "structured release liner" refers to a release liner having topographical features in at least a portion of an outer surface of the release liner. As described below, a structured release liner may be used to impart topographical features into a curable adhesive layer of the present invention. Any structured release liner known to those skilled in the art may be used in the present invention. Suitable structured release liners for use in the present invention include, but are not limited to, structured release liners disclosed in U.S. Pat. No. 6,197,397 and International Publication No. WO94/00525, the disclosures of both of which are hereby incorporated by reference.

A typical structured release liner 126 used to create an embossed pattern in a curable adhesive layer is shown in FIG. 2. The release liner 126 includes a pattern of raised V-shaped ridges 128 separated by substantially planar land areas 123. As illustrated in FIG. 3, an adhesive layer 122 may be coated onto the embossed release liner 126 to create an embossed pattern of the adhesive layer. When the release liner 126 is removed, the adhesive layer 122 has a topography with substantially V-shaped grooves 132 and land areas 134 that is essentially the inverse of the topography of the raised ridges 128 and land areas 123 on the backing or release liner 126 (i.e., an inverted image of the release liner topography).

In the embodiments of FIGS. 2-3, the grooves 132 in the adhesive form substantially continuous open pathways that extend into the adhesive from an exposed surface. The grooves either terminate at the peripheral portion of the adhesive layer or communicate with other channels that terminate at a peripheral portion of the article. When the article is applied to a substrate, the pathways provide an egress to a periphery of the article for fluid trapped at the interface between the adhesive layer and the substrate.

It should be noted that release liner 126 is only one of many possible structured release liners that could be used in the present invention. Any structured release liner capable of imparting topographical features into the curable adhesive layer of the present invention may be used.

3. Other Possible Layers

The curable adhesive articles of the present invention may also include one or more additional layers, which may provide temporary or permanent properties to the curable adhesive articles. Suitable additional layers may be positioned on one or both sides of the curable adhesive layer. In some embodiments of the present invention, the one or more additional layers are flexible such that the resulting curable adhesive articles may be rolled into a roll. The one or more additional layers may function as tie layers, primer layers, or barrier layers. Suitable additional layers include, but are not limited to, polymer films, metal foils, papers, foam sheets, and fabrics. The one or more additional layers may be attached to the curable adhesive layer by a pressure-sensitive adhesive as described above or by the curable adhesive layer composition itself.

Referring to FIGS. 4A and 4B, examples of suitable substrates 350 and 360 include glass, metal, plastic, wood, and ceramic substrates, painted surfaces of these substrates, and the like. Representative plastic substrates include polyester, polyvinyl chloride, ethylene-propylene-diene monomer rubber, polyurethanes, polymethyl methacrylate, engineering thermoplastics (e.g., polyphenylene oxide, polyetheretherketone, polycarbonate), and thermoplastic elastomers. The substrate may also be a woven fabric formed from threads of synthetic or natural materials such as, for example, cotton, nylon, rayon, glass or ceramic material. The substrate may also be made of a nonwoven fabric such as air-laid webs of natural or synthetic fibers or blends thereof.

II. Methods of Making A Curable Adhesive Article

As described above, the curable adhesive articles of the present invention contain one or more layers. Exemplary methods of making one or more suitable layers are described below.

A. Methods of Making a Curable Adhesive Layer

The curable adhesive layers of the present invention may be made by methods described in U.S. Pat. Nos. 6,197,397 and 5,260,215, the disclosures of both of which are incorporated herein by reference. The topography may be created in the curable adhesive layer by any contacting technique, such as casting, coating or compressing. The topography may be made by at least one of: (1) casting the adhesive layer on a tool with an embossed pattern, (2) coating the adhesive layer onto a release liner with an embossed pattern, (3) contacting an adhesive layer with a tool or structured release liner, (4) passing the adhesive layer through a nip roll to compress the adhesive against a release liner with an embossed pattern, and (5) optionally at least partially curing the curable adhesive layer via exposure to heat, light or a combination thereof to minimize premature cold flow during bonding or lamination. The topography of the tool used to create the embossed pattern may be made using any known technique, such as, for example, chemical etching, mechanical etching, laser ablation, photolithography, stereolithography, micromachining, knurling, cutting or scoring.

As shown in FIG. 2, exemplary liner 126 may be any release liner or transfer liner known to those skilled in the art that is capable of being embossed as described above. The liner 126 should also be capable of being placed in intimate contact with a curable adhesive layer of the present invention and subsequently removed without damaging the curable adhesive layer. Non-limiting examples of liners include materials from 3M of St. Paul, Minn., Rexam Corporation of Iowa City, Iowa, Daubert Coated Products of Westchester, Ill., P.S Substrates, Inc., Schoeller Technical Papers, Inc., Assi-Doman Inncoat GMBH, and P.W. A. Kunstoff GMBH. The liner 126 is typically a polymer-coated paper with a silicone release coating, a polyethylene coated polyethylene terephthalate (PET) film with silicone release coatings, or a cast polyolefin film with a silicone release coating.

In one exemplary embodiment of the present invention, a curable adhesive layer comprising a structural hybrid adhesive at its PSA stage is embossed by laminating the curable adhesive layer to a structured release liner, such as liner 126. The curable adhesive layer may be partially cured by UV light while on the liner. The resulting curable adhesive layer retains its tackiness, as well as its structure under a pressure used to apply the curable adhesive layer to a substrate. After removing the liner and laminating the curable adhesive layer to a substrate, the curable adhesive layer may be further cured to build adhesion to the substrate while becoming a fully structural adhesive layer.

A variation of the above embodiment is to emboss the curable adhesive layer with a structured release liner, remove the liner and apply light pressure to laminate the curable adhesive layer to a substrate, then cure the curable adhesive layer into a structural bond. In this embodiment, the adhesion to the substrate is typically stronger, but the topographical features tend to exhibit some deformation from the lamination step while the curable adhesive layer is still in the PSA stage.

Another variation may be to coat the curable adhesive layer onto a structured release liner or tool to create the topographical features on the adhesive surface. The curable adhesive layer may be a solvent-based adhesive so that on drying and removal of the solvent, the adhesive retains the shape of the structured release liner or tool. The curable adhesive layer adhesive composition may also be substantially 100% solids so that it is polymerized or cured on the structured release liner or tool. If a tool is used, the dried or cured adhesive is then laminated onto a liner or a substrate for further processing.

B. Methods of Making Multi-Layered Articles

The present invention is also directed to methods of making multi-layered articles, wherein the article comprises at least one curable adhesive layer. Exemplary methods are described below.

1. Dual Adhesive Layers

In one embodiment of the present invention, a dual adhesive layer system is constructed with one layer being a structural hybrid adhesive layer (i.e., a curable adhesive layer) or a structural adhesive layer and another layer being a PSA or a structural hybrid adhesive layer (i.e., a curable adhesive layer). This system has the following advantages. The dual layer can be prepared and easily embossed with a structured liner at the PSA stage. It can then be fully cured on a tool or structured liner. Now, the core and base of the structural hybrid adhesive becomes structural while the PSA outer layer remains a PSA. Due to the strength of the structural core and base, the topographical features of the structural adhesive layer will retain their integrity. During lamination to a substrate, the PSA layer will provide the adhesion and the structural adhesive layer core will help retain the topographical features. This system provides minimum change in contact area during lamination.

The curable adhesive layer in the dual layer system may be prepared as described above. Additional adhesive layers may be applied to the curable adhesive layer by any conventional method including, but not limited to, solution coating, hot melt coating, lamination, etc. The dual layer system can be at least partially cured by radiation, e.g., UV light, thermal, or any other means, prior to or after contacting a substrate. Full curing may also take place prior to or after contacting a substrate when a PSA layer is present.

2. Other Multi-Layered Articles

Other multi-layered articles may be prepared using conventional bonding and/or lamination techniques as described above. In order to minimize deformation or distortion of topographical features on a curable adhesive layer, either (i) apply a minimum amount of pressure to bond or laminate the curable adhesive layer to an additional layer, or (ii) partially cure the curable adhesive layer prior to contacting the additional substrate. Partial curing of the curable adhesive layer does not negatively impact the pressure-sensitive adhesive properties of the curable adhesive layer, but adds structural integrity to the topographical features prior to contacting the additional substrate.

III. Specific Exemplary Uses of the Curable Adhesive Articles

The curable adhesive articles of the present invention may be used in a number of applications. As described above, the curable adhesive articles may comprise a single curable adhesive layer or may comprise one or more layers in addition to a curable adhesive layer. The curable adhesive articles of the present invention may be present in the form of a strip, tape, roll of tape, or any other construction known in the art. The curable adhesive articles may be bonded to one or more substrates as described above to provide a multi-layered article having a desired degree of contact between the curable adhesive article and one or more substrates bonded thereto.

Exemplary applications for the curable adhesive articles of the present invention are described below.

A. Reflective Sheeting Constructions

Figure 5:
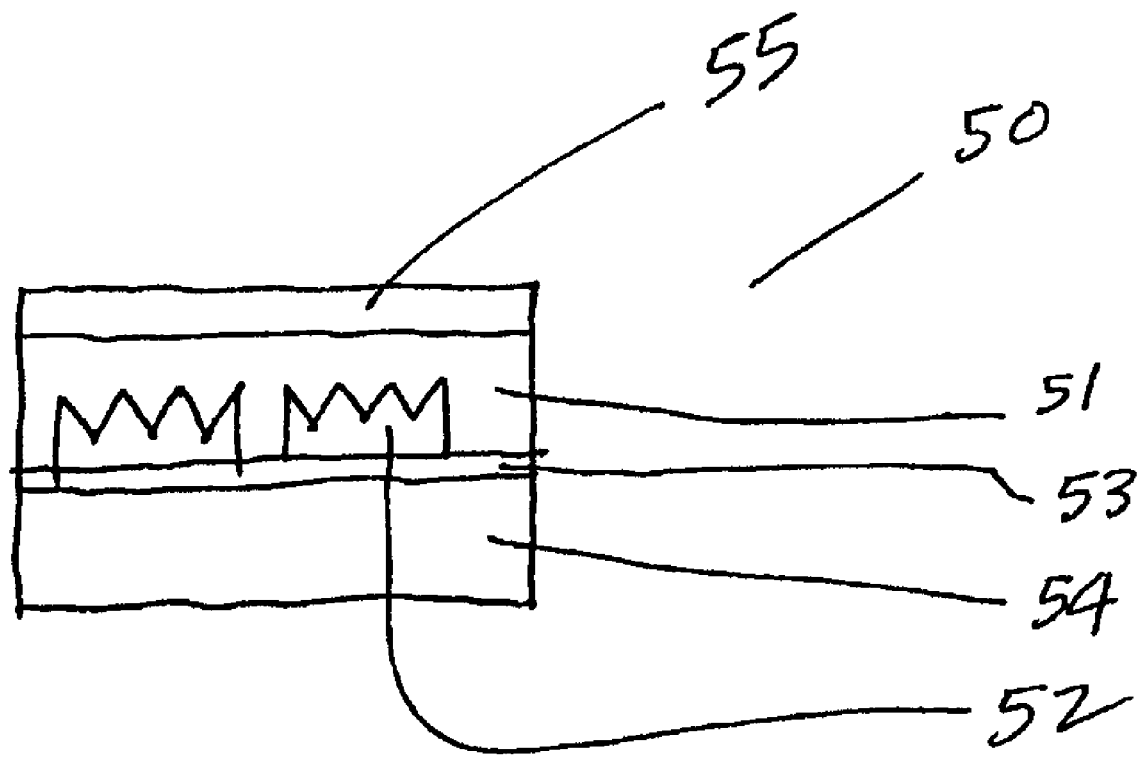
FIG. 5 is a cross-sectional view of an exemplary reflective sheeting construction comprising a curable adhesive layer.

The curable adhesive articles of the present invention may be used to form reflective sheeting constructions such as the exemplary reflective sheeting construction shown in FIG. 5. As shown in FIG. 5, exemplary reflective sheeting construction 50 comprises curable adhesive layer 51 bonded to a first substrate 55 and a second substrate 54 having a coating 53 thereon. Topographical features 52 within curable adhesive layer 51 represent void spaces filled with air. In one desired embodiment of the present invention, curable adhesive layer 51 comprises an optically clear structural hybrid adhesive having a refractive index substantially equal to the refractive index of polycarbonate; first substrate 55 comprises a polymethylmethacrylate (PMMA) film; second substrate 54 comprises an aluminum substrate; and coating 53 comprises an optional adhesion promoter.

Exemplary reflective sheeting construction 50 may be prepared by coating (or contacting) an optically clear structural hybrid adhesive layer onto (with) a PMMA film; embossing the structural hybrid adhesive layer of the resulting article with a structured release liner or tool; laminating the embossed article to an aluminum substrate optionally coated with an adhesion promoter; and curing of the construction via UV radiation. As discussed above, the curing step may take place before or after lamination depending on the desired rigidity of the topographical features, degree of deformation of the topographical features, and the desired adhesion level.

B. Bar Coding Applications

The microstructured adhesives of the present invention can be used as overlaminates on black aluminum oxide substrates to form materials useful for bar coding labels. The use of microstructured adhesives having a fluid egress in overlaminate articles allow the substrates to be imaged by lasers, both low-powered, as well as, high-powered lasers, such as a high-powered Nd-YAG laser, without bubbling. Bubbling can be problematic for buried images. In another construction for a labelstock, a microstructured curable adhesive is in contact with the aluminum oxide layer, but the adhesive is on the underside of the imageable metal layer, and not part of an overlaminate. Laser imaging and viewing of images is carried out through a clear polyester film base layer of the metallized substrate, rather than through a patterned overlaminate. High quality bar code images can be obtained using the microstructured adhesives of the present invention.

C. Blackout Applications

The curable adhesive articles of the invention can be used to laminate films to substrates for signage (e.g., advertising, canvas marking films, traffic signs), automotive applications (e.g., affixing decorative decals or films to a vehicle, affixing Blackout Film on door pillars of a vehicle), and other applications where a structural bond is desired, but it is desirable to maintain the topographical features of the adhesive to allow air egress.

D. Detection Articles

The curable adhesive articles of the present invention may be used as microchanneled fluid transport films. The adhesive can be used to make articles for collecting and transporting fluids for subsequent analysis. Such articles are used for reagent cards for biological assays, molecular separations, immunoassays, cell analysis, particle manipulations, DNA hybrid assays, and the like. Constructions of such devices are detailed in PCT publication WO 01/02093, the disclosure of which is incorporated herein in its entirety by reference. The articles typically include a series of channels that can transport fluids by, for example, capillary action. In the present application, an array of appropriately sized microchannels may be formed by ridges of a curable adhesive layer disposed on a substrate (e.g., polymeric film, ceramic plate, etc.) and partially cured. The article may then be laminated to a second substrate and fully cured. Alternatively, several layers of the partially cured microchanneled adhesives may be stacked on top of each other to form a multi-layer article and cured.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

These examples are merely for illustrative purposes only and are not meant to be limiting on the scope of the appended claims. All parts, percentages, ratios, etc. in the examples and the rest of the specification are by weight unless indicated otherwise.

| Table of Abbreviations | |
| --- | --- |
| AA | Acrylic acid |
| MA | Methyl Acrylate |
| BA | n-Butyl Acrylate |
| IOA | Isooctyl acrylate |
| IRGACURE 651 | Photoinitiator 2,2 dimethoxy-2-phenylacetophenone, available from Ciba; Hawthorne, NJ |
| IRGACURE 819 | Photo curing agent, (CIBA) |
| TTE | Trimethylolpropane triglycidyl ether, commercially available from Aldrich Chemicals, Milwaukee, WI |
| CD1012 | Photoinitiator commercially available from Sartomer Company, Exton, PA |
| RHODORSIL 2074 | Photoinitiator commercially available from Rhodia Inc., Cranbury, NJ |
| EBECRYL CL 1039 | Urethane mono-acrylate oligomer (UCB Chemicals; Smyrna, GA) |
| CN964 | Urethane diacrylate oligomer from Sartomer, used as a 33% solution in ethyl acetate |
| EPON 828 | Aromatic epoxy component commercially available from Resolution Chemicals, Houston, TX |
| Anthracene | Commercially available from Aldrich Chemical, Milwaukee, WI |
| Polycarbonate Plate | 4.4 millimeter thick LEXAN commercially available from General Electric, Schenectady, NY |
| PET | polyester film of polyethylene terephthalate |

Example 1

A structural hybrid adhesive having a composition as described in co-pending application, U.S. Ser. No. 10/005,669 entitled "Hybrid Adhesives, Articles, and Methods" (Example 4 in Table 1), was coated onto a transparent polyester film (PET) and dried to remove the solvent. The adhesive composition was a blend of (i) epoxy resin (EPON 828), and (ii) a solvent-based acrylate pressure-sensitive adhesive (PSA) that was 26% solids in solvent and having a composition of 57.5 parts IOA, 35 parts MA, 7.5 parts AA in ethyl acetate/toluene blend), a photoinitiator (RHODORSIL 2074), photosensitzer (anthracene), and a crosslinker (TTE) formed using a conventional thermal free-radical polymerization process. The exposed adhesive face was then laminated to a microstructured tool using a roller and sufficient pressure to emboss the adhesive. The microstructured tool had a regular array of posts in the shape of hexagons measuring about 175 microns in diameter (between parallel walls) and having depressions around each is hexagon measuring about 40 microns in width and about 80 microns in depth. The resulting microstructured adhesive had a regular grid formed by ridges of adhesive. The laminated adhesive was partially cured using UV radiation (Fusion UV Curing System with a Fusion "D" bulb, 300 Watts/inch) by passing the laminated adhesive through the chamber with the polyester film side facing the bulb at a speed of 7.62 meters per minute six times. The microstructured liner was then removed and a glass plate was lightly pressed against the microstructured surface of the adhesive. The adhesive was allowed to fully cure at room temperature to form a permanent bond between the PET film and the glass plate. The fully cured adhesive maintained the details of the microstructure, i.e., clearly discernable ridges of adhesive forming a hexagonal shape.

The adhesive of this example had a curing profile curve having a large slope at the beginning and a long slow tail. When exposed to UV light, the adhesive cured to a semi-structural state (e.g., a relatively large amount of the adhesive crosslinked and/or polymerized) but retained its pressure sensitive adhesive properties (e.g., tacky at room temperature and capable of bonding to another substrate. The semi-structural adhesive had sufficient integrity to maintain the topographical features during lamination and throughout the curing process, which continued for several hours before the adhesive became completely structural. A photograph of the resulting adhesive article is shown in FIG. 6.

Figure 6:
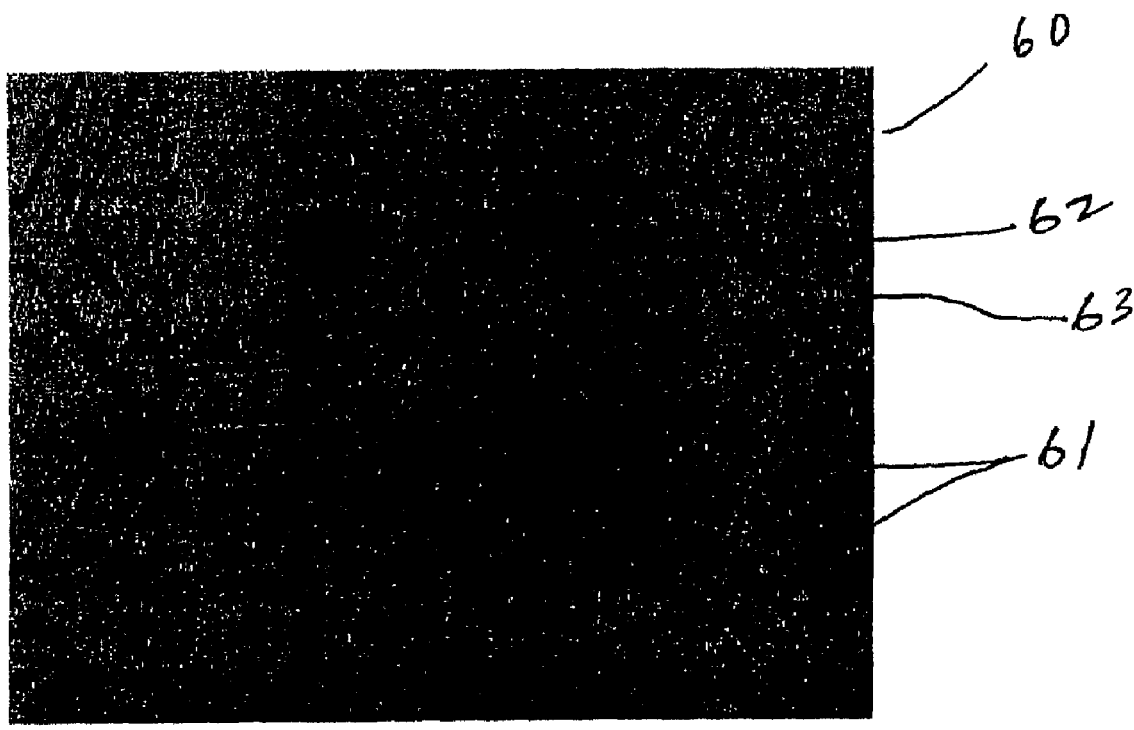
FIG. 6 is a photograph of an exemplary adhesive article having topographical features (prepared in Example 1) bonded to a glass substrate.

As shown in FIG. 6, the resulting adhesive article 60 had topographical features 61, which were formed as the inverted image of the above-described release liner (not shown). The ridges 62 and depressions 63 of the adhesive article 60 were sharp and the pattern was well defined.

During the curing step, adhesion to the glass increased to form a permanent bond. This example illustrates how the curing profile of an adhesive can be tailored to optimize adhesion build-up with structural retention unlike pressure sensitive adhesives prior to the present invention.

A flat film of the adhesive, i.e. with no added microstructures, was optically clear and had the following properties as measured according to American Society for Testing and Measurement (ASTM) Test Method D 1003-95 ("Standard Test for Haze and Luminous Transmittance of Transparent Plastic") using a TCS Plus Spectrophotometer from BYK-Gardner Inc.; Silver Springs, Md.: luminous transmittance (averaged 380-720 nm) of 95%, haze of C2°=0.9 and A2°=0.9, and opacity of C2°=0.3, A2°=0.3. Haze and opacity values are given for both illuminant C with CIE 2° standard observer (C2°) and illuminant A with CIE 2° standard observer (A2°). The BYK Gardner TCS Plus Spectrophotometer was used for opacity measurement with the standard size reflectance port (25mm) installed, and diffuse reflectance (specular excluded) was measured. Desired optical property value is opacity <1% While the adhesive itself is optically clear, the microstructures can impart haze and diffusive properties to an article with a layer of this microstructured adhesive.

Example 2

An adhesive was prepared according to the procedure of Example 1 Before curing with UV light, the microstructured adhesive was laminated with a roller to a glass plate applying high pressure by hand. During this lamination, the topographical features deformed resulting in a grid of irregularly shaped depressions with no adhesive contacting the glass plate, bounded by wide flat ridges of adhesive contacting the glass plate. The regularity of the pattern was not particularly discernable. A photograph of the resulting adhesive article is shown in FIG. 7.

Figure 7:
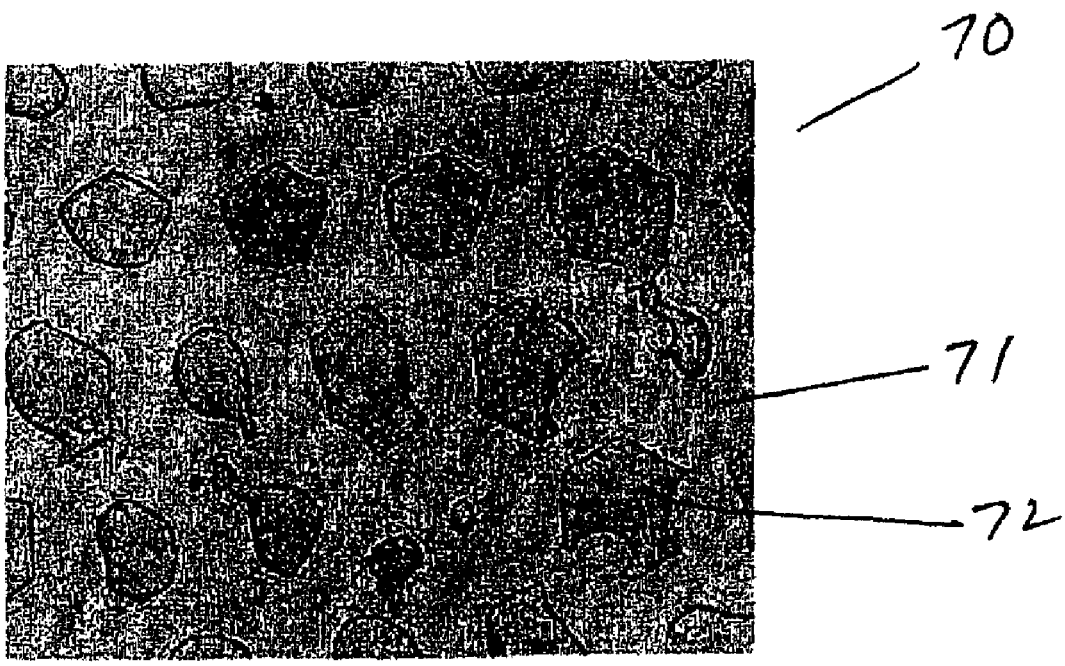
FIG. 7 is a photograph of an adhesive article (prepared in Example 2) bonded to a glass substrate using high application pressure, which distorts topographical features of the adhesive article.

As shown in FIG. 7, the resulting adhesive article 70 had intersecting portions of adhesive 71 surrounding irregularly shaped depressions 72 scattered throughout the adhesive 71.

The adhesive was then exposed to UV light as in Example 1 to cure the adhesive, forming a permanent bond between the glass and PET. This example, with Example 1, illustrates that the microstructures may be deformed if the adhesive does not have sufficient integrity to withstand the pressures, if they are high, used to laminate the substrate. Partial curing of this particular adhesive helped to provide added modulus to the adhesive to help retain the structures.

Example 3

An adhesive was prepared according to the procedure of Example 2 except that the adhesive was laminated to a glass plate by contacting the adhesive surface to the plate and very lightly pressing so as to maintain the adhesive structure. The adhesive was then exposed to UV light to cure the adhesive to a permanent bond. The topographical features of the adhesive exhibited some slight widening and deformation of the ridges as compared to the width of the ridges in the liner, but hexagonal shape and regularity of the pattern were clearly maintained. A photograph of the resulting adhesive article is shown in FIG. 8.

Figure 8:
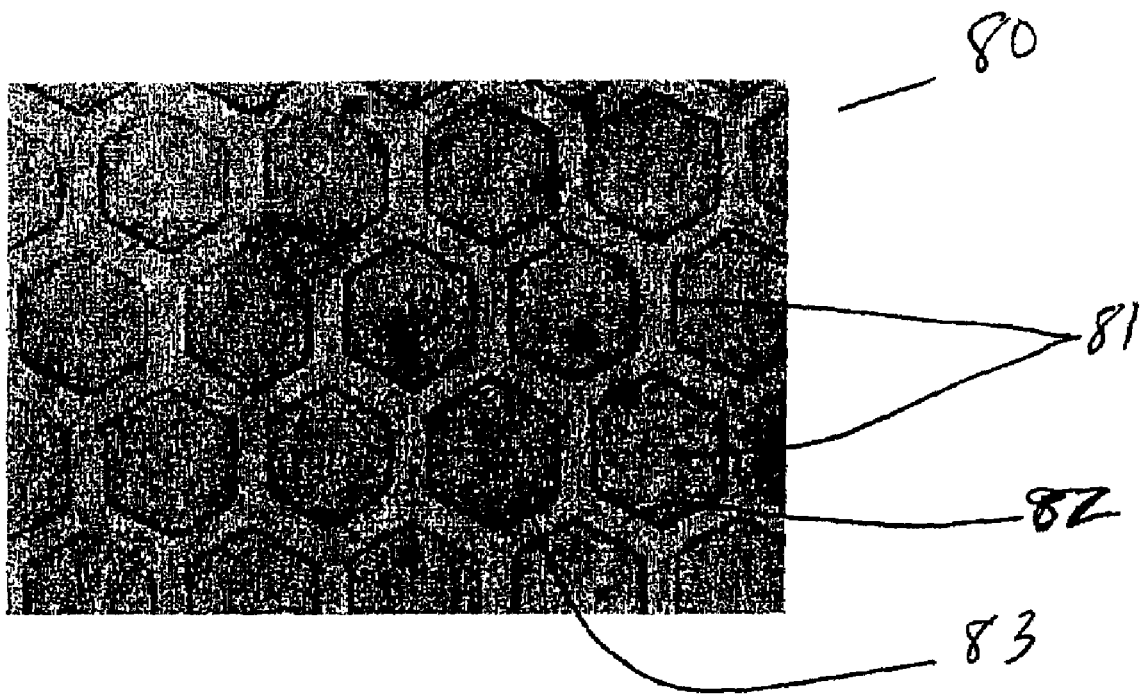
FIG. 8 is a photograph of an adhesive article (prepared in Example 3) bonded to a glass substrate using a light application pressure, and having topographical features on the adhesive article.

As shown in FIG. 8, the resulting adhesive article 80 had topographical features 81, which were formed as the inverted image of the above-described release liner (not shown). The ridges 82 and depressions 83 of the adhesive article 80 were relatively sharp and the pattern was well defined, although exhibiting some slight widening and deformation.

Example 4

The adhesive of Example 1 was coated onto a microstructured liner (described in U.S. Pat. No. 5,296,277 (Wilson et al.). The liner had a square grid pattern with truncated pyramidal depressions having a pitch of 300 micrometers. The depressions also had, at the bottom of the depression, circular flat-bottomed pits about 50×15 microns (width×depth). The pits covered about 3% of the total surface area of the liner. The adhesive was dried in an oven at 70° C. for 10 minutes to form a dry adhesive film of about 1 mil thick (25 micrometers) and exposed to UV radiation as described in Example 1 using 4 passes at 7.62 m/min. The adhesive was laminated to a sheet of primed polyester film. The microstructured liner was then removed and a square sheet of 3M brand Brightness Enhancement Film (BEF) measuring about 63.5 mm by 63.5 mm was laminated to the structured surface. A glass plate was placed on top of BEF film for a few seconds to evenly apply pressure to the adhesive. The adhesive was then cured with 2 more passes through the UV chamber at 7.62 m/min. with the PET film facing the bulb. After aging overnight, the cured sample permanently bonded the two films together, and the topographical features were well retained.

Example 5

An adhesive was prepared according to the procedure of Example 4 except that the BEF film was laminated to the adhesive prior to any exposure to UV light. The glass plate was placed on top of the film laminate for a few seconds to evenly apply pressure to the adhesive. The adhesive was then exposed to 6 passes through the UV curing chamber with the PET film facing the bulb. After aging, the films were permanently bonded together and the topographical features were maintained, although not as well as in Example 4.

Example 6

An adhesive was prepared according to the procedure of Example 4 except that a 63.5 mm by 63.5 mm square of diffuse PET film (Melinex 377, 500 gauge) was laminated to the structured surface instead of the BEF film, and exposed to UV radiation with the diffuse PET film facing the bulb. The resulting laminate was permanently bonded together and the topographical features were well maintained.

Example 7

An adhesive was prepared according to the procedure of Example 5 except that the laminate a 63.5 mm by 63.5 mm square of diffuse PET film (Melinex 377, 500 gauge) was laminated to the structured surface instead of the BEF film, and exposed to UV radiation with the diffuse PET film facing the bulb. The resulting laminate was permanently bonded together and the topographical features were maintained.

Example 8

The structural hybrid adhesive of Example 1 was coated to a dry thickness of about 38 to 51 micrometers on a PET release liner. A solvent-based acrylic PSA was coated to a thickness of about 5 micrometers (dry thickness) on a release liner and dried. The two adhesives were then laminated together and the dual layer sample was laminated onto a tool having hexagonal cells measuring 175 microns in diameter (between parallel walls) with the PSA layer facing the tool. Pressure was applied to emboss the pattern of the tool into the adhesive layers. The adhesive was UV cured through the PET liner as in Example 1 using UV radiation (Fusion UV Curing System with a Fusion "D" bulb, 300 Watts/inch) by passing the laminated adhesive through the chamber with the PET side facing the bulb at a speed of 7.62 meters per minute six times. After removal of the adhesive from the tool, the hexagonal structures were well retained from the cured adhesive, and the PSA retained its PSA properties to give the structure enhanced adhesion to substrates.

Example 9

A dual layer adhesive was prepared according to the procedure in Example 8 except that 20% by weight of polystyrene particles (5 micron, index of refraction=1.59) were added to the structural hybrid adhesive prior to coating. After fully curing, the adhesive exhibited diffusing properties. This adhesive construction is suitable for an optical diffuser.

Example 10

An adhesive sheet is prepared by mixing 10 parts of epoxy (Epon 828) with 89 parts of DYNAPOL S1402 polyester and 1 part tripyhenylsulfonium hexafluoroantimonate and mixed for about one hour at 110° C. The sheet is knife coated on a bar coater (heated to 127° C. onto a polyester film to a thickness of about 50 micrometers. The cooled sheet is then laminated to a 51 micrometer thick adhesive transfer tape (F9560PC—2 mil adhesive transfer tape available from 3M Company, St. Paul, Minn.). The PSA side of this laminate is pressed into the microstructured tool of Example 8 at 177° C. for 30 minutes. The resulting adhesive structure is laminated to a second polyester film under firm hand pressure to form a laminated construction.

Example 11

A microstructured dual layer adhesive is prepared according to the procedure of Example 8 except that instead of a PSA, a layer of a B-staged epoxy resin film adhesive (SCOTCH-WELD Structural Adhesive Film AF 191 available from 3M Company, St. Paul, Minn.) is used. After UV curing, through the PET liner, the microstructured adhesive surface is retained while the epoxy adhesive skin layer is available for further bonding another substrate and curing at elevated temperatures.

Example 12

A curable pressure-sensitive adhesive composition as described in co-pending application, U.S. patent application Ser. No. 10/331,374 entitled "CURABLE PRESSURE-SENSITIVE ADHESIVE COMPOSITIONS" filed Dec. 30, 2002 (Example 4) was prepared by dissolving 416 mg of bis-aziridine crosslinker (in 5wt % solution, described in U.S. Pat. No. 5,874,143 column 4, line 49) in 5 grams of ethyl acetate in a brown reaction vessel. Then 1.75 grams of urethane-acrylate oligomer (CN964), 172 mg Irgacure 819, 20 grams of the solvent-based PSA referred to in Example 1, and 1.73 grams of urethane acrylate oligomer (Ebecryl CL 1039) are added and mixed, to yield an adhesive mixture with a 30% by weight acrylated oligomer content. The adhesive is coated onto the PET film and dried at 70° C. for 10 minutes to yield a 37.5 micrometer thick dry PSA tape. The dry PSA tape is pressed against the tool of Example 8 to form an array of hexagons. A sheet of the PSA tape measuring 5 cm by cm is placed on top of a polycarbonate plate by pressing very lightly to preserve the structure. After a 24 hour dwell, the laminate is irradiated (through the PET film) with a Fusion UV Curing System at the following conditions for a total UVA (320-390nm) dose of about 2 J/cm$^2$: Fusion "D" bulb, 300 Watts/Inch, 7.62 m/minute, 2 passes. After irradiation, the laminate is stored at ambient temperature for at least 24 hours to form a permanent bond.

Example 13

The structural hybrid adhesive of Example 1 is coated to a thickness of about 100 micrometers on a PET film. The adhesive surface is embossed with a tool having lengthwise channels and a rectangular cross section approximately 0.9 mm deep by about 2 mm wide. The adhesive is exposed to 6 passes of UV radiation as detailed in Example 1, and is then laminated to another PET film to form a sheet having a series of capillary channels.

Example 14

An embossed structural hybrid adhesive is prepared according to the procedure of Example 13 except that after irradiation with 6 passes, the adhesive coated film is cut into 3 sections measuring about 10 cm by 10 cm. The sheets are then stacked on top of each other with the channels running in the same direction and pressing lightly with hand pressure to adhere the layers together to form a multi-layer sheet of capillary channels.

Example 15

A pre-adhesive composition is prepared by mixing 71 g of IOA with 29 g of NVP and 0.04 g of IRGACURE 651 photoinitiator, and photopolymerizing with an ultraviolet (UV) light source under constant nitrogen purge to a viscosity of nearly 2000 cps. With continuous mixing, the following are added: an additional 0.1 g of IRGACURE 651, 3 g of 1,6,-hexanedioldiacrylate, 50 g of epoxy resin (Epon 828), 5 g of micronized dicyandiamide (DICY) hardener and 2.5 parts of p-chlorophenyl-dimethyl urea accelerator available from Aceto Chemical Company. After mixing for two hours with a laboratory propeller mixer, the blend is degassed and knife-coated onto PET film to a thickness of about 250 micrometers. The microstructured release liner of Example 1 is placed over the adhesive and the laminate is photopolymerized using a UV light source using a total energy of 650 mJ/cm$^2$ with an exposure of average intensity of about 2.5 mW/cm$^2$ on each side of the adhesive laminate, measured using the National Institute Standards units (NIST). After polymerizing, the microstructured liner is removed and a PET film is laminated to the exposed microstructured adhesive. The adhesive is then cured for 20 minutes at 177° C.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A curable adhesive article comprising:
a partially cured curable continuous adhesive layer having a plurality of microstructures or macrostructures forming at least a portion of a first outermost surface of the curable adhesive layer, wherein the first outermost surface of the curable adhesive layer (i) has sufficient tackiness to bond to a substrate, and (ii) has the ability to cure to a structural state so as to substantially retain an initial structured surface profile when exposed to temperatures greater than about 37.8° C. (100° F.), wherein the curable adhesive layer comprises a structural hybrid adhesive.

2. The curable adhesive article of claim 1, wherein the curable adhesive layer comprises a thermosettable or UV-curable component.

3. The curable adhesive article of claim 2, wherein the thermosettable component comprises an epoxy.

4. The curable adhesive article of claim 1, wherein the curable adhesive layer comprises an interpenetrating polymer network (IPN) comprising a thermosettable component and a thermoplastic component.

5. The curable adhesive article of claim 4, wherein the thermosettable component comprises an epoxy and the thermoplastic component comprises a polyacrylate.

6. The curable adhesive article of claim 1, wherein the curable-adhesive layer comprises an epoxy and at least one material selected from polyurethane, ethylene vinyl acetate, polyacrylate, and polyester.

7. The curable adhesive article of claim 1, wherein the curable adhesive layer comprises a polyacrylate and at least one material selected from epoxy and one or more mono-and/or multi-acrylate oligomers.

8. The curable adhesive article of claim 1, wherein the curable-adhesive layer comprises a polyurethane and at least one material selected from epoxy and polyacrylate.

9. The curable adhesive article of claim 1, wherein the curable adhesive layer comprises one or more mono- and/or multi-acrylate oligomers.

10. The curable adhesive article of claim 1, wherein the curable adhesive layer comprises a polyacrylate.

11. The curable adhesive article of claim 1, further comprising:
- a microstructured or macrostructured release liner temporarily bonded to the first outermost surface of the curable adhesive layer, wherein an outermost surface of the microstructured or macrostructured release liner facing the first outermost surface of the curable adhesive layer is an inverted image of the first outermost surface of the curable-adhesive layer.

12. The curable adhesive article of claim 1, further comprising:
- a second adhesive layer on the first outermost surface of the curable adhesive layer.

13. The curable adhesive article of claim 12, wherein the second adhesive layer comprises a pressure sensitive adhesive layer.

14. The curable adhesive article of claim 13, wherein the pressure sensitive adhesive layer has a substantially uniform thickness across the first outermost surface of the curable-adhesive layer.

15. The curable adhesive article of claim 12, wherein the second adhesive layer comprises a heat-activatable adhesive layer.

16. The curable adhesive article of claim 13, wherein the second adhesive layer comprises a second curable adhesive layer.

17. The curable adhesive structure of claim 14, further comprising:
- a microstructured or macrostructured release liner temporarily bonded to the pressure sensitive adhesive layer, wherein an outermost surface of the microstructured or macrostructured release liner facing the pressure sensitive adhesive layer is an inverted image of the first outermost surface of the curable adhesive layer.

18. A structural adhesive article formed by fully curing the curable adhesive structure of claim 1.

19. A structural adhesive article formed by fully curing the curable adhesive structure of claim 13.

20. The curable adhesive article of claim 1, wherein the curable-adhesive layer has a second outermost surface opposite the first outermost surface, wherein the second outermost surface has (i) sufficient tackiness to bond to a substrate, and (ii) cures to a structural state so as to substantially retain an initial structured surface profile when exposed to temperatures greater than about 37.8° C. (100° F.).

21. The curable adhesive article of claim 20, wherein the second outermost surface comprises a plurality of microstructures or macrostructures forming at least a portion of a second outermost surface.

22. The curable adhesive article of claim 21, further comprising:
- a microstructured or macrostructured release liner temporarily bonded to the second outermost surface of the curable adhesive layer, wherein an outermost surface of the microstructured or macrostructured release liner facing the second outermost surface of the curable adhesive layer is an inverted image of the second outermost surface of the curable adhesive layer.

23. The curable adhesive article of claim 20, further comprising:
- a second adhesive layer on the second outermost surface of the curable adhesive layer.

24. The curable adhesive article of claim 23, wherein the second adhesive layer comprises a pressure sensitive adhesive layer.

25. The curable adhesive article of claim 20, wherein the second outermost surface of the curable adhesive layer is substantially free of microstructures or macrostructures.

26. The curable adhesive article of claim 12, wherein the curable adhesive layer, the second adhesive layer, or both contain particulate material.

27. The curable adhesive article of claim 26, wherein the particulate material comprises light-diffusing particles, conductive particle, carbon black, fibers, conductive fibers, or a combination thereof.

28. The curable adhesive article of claim 13, wherein the curable adhesive layer contains light-diffusing particles, and the pressure sensitive adhesive layer does not contain particulate material.

29. The curable adhesive article of claim 13, wherein the curable adhesive layer and the pressure sensitive adhesive layer both contain conductive particles, carbon black, conductive fibers, or both.

30. The curable adhesive article of claim 20, further comprising:
- at least one substrate bonded to the first outermost surface, the second outermost surface, or both.

31. The curable adhesive article of claim 20, further comprising:
- an aluminum substrate on the first outermost surface; and
- a polymethylmethacrylate (PMMA) film on the second outermost surface.

32. An adhesive article comprising:
- a partially cured curable continuous adhesive layer having a plurality of microstructures or macrostructures forming at least a portion of a first outermost surface of the curable adhesive layer, so that the first outermost surface of the curable adhesive layer (i) has sufficient tackiness to bond to a substrate, and (ii) has the ability to cure to a structural state so as to substantially retain an initial structured surface profile when exposed to temperatures greater than about 37.8° C. (100° F.), wherein the curable adhesive layer comprises a structural hybrid adhesive; and
- a second adhesive layer on an outermost surface of the curable adhesive layer.

33. The adhesive article of claim 32, wherein the second adhesive layer is a pressure sensitive adhesive layer.

34. The adhesive article of claim 33, wherein the curable adhesive layer comprises a structural hybrid adhesive, and the pressure sensitive adhesive layer is on the first outermost surface of the curable adhesive layer.

35. A structural adhesive article formed by fully curing the adhesive article of claim 33.

36. The adhesive article of claim 32, further comprising:
- a microstructured or macrostructured release liner on the first outermost surface of the curable adhesive layer, wherein an outermost surface of the microstructured or macrostructured release liner facing the first outermost surface of the curable adhesive layer is an inverted image of the first outermost surface of the curable adhesive layer.

37. The adhesive article of claim 33, wherein the pressure sensitive adhesive layer has a substantially uniform thickness.

38. The adhesive article of claim 33, wherein the pressure sensitive adhesive layer is on a second outermost surface of the curable adhesive layer opposite the first outermost surface.

39. The adhesive article of claim 38, wherein the second outermost surface of the curable adhesive layer is substantially free of microstructures or macrostructures.

40. The adhesive structure of claim 33, wherein the curable adhesive layer, the pressure sensitive adhesive layer, or both contain particulate material.

41. The adhesive article of claim 33, further comprising:
at least one substrate bonded to the curable adhesive layer, the pressure sensitive layer, or both.

42. An article comprising:
the adhesive article of claim 33;
an aluminum substrate on the first outermost surface; and
a polymethylmethacrylate (PMMA) film on a second outermost surface opposite the first outermost surface.

43. A method of bonding a substrate to a curable adhesive article comprising steps of:
contacting the substrate with an outermost surface of the curable adhesive article of claim 1; and
fully curing the curable adhesive article.

44. A method of bonding a substrate to a curable adhesive layer comprising the steps of:
forming a curable continuous adhesive layer having a plurality of microstructures or macrostructures on at least a portion of a first outermost surface of the curable adhesive layer, wherein the curable adhesive layer comprises a structural hybrid adhesive;
partially curing the curable adhesive layer;
contacting a substrate with an outermost surface of the curable adhesive layer; and
fully curing the curable adhesive layer.

45. The method of claim 44, wherein the curable adhesive layer (i) has sufficient tackiness to bond to a substrate, and (ii) cures to a structural state so as to substantially retain an initial structured surface profile when exposed to temperatures greater than about 37.8° C. (100° F.).

46. The method of claim 44, wherein the step of forming a curable adhesive layer comprises the steps of:
coating an adhesive onto a release liner having an outermost surface that is an inverted image of the first outermost surface of the curable adhesive layer.

47. The method of claim 44, wherein the step of forming a curable adhesive layer comprises the steps of:
forming an embossible layer of adhesive; and
embossing at least one outer surface of the embossible layer with a tool having an outermost surface that is an inverted image of the first outermost surface of the curable adhesive layer.

48. The method of claim 44, wherein each of the curing steps independently comprise exposing the curable adhesive layer to heat, ultraviolet (UV) radiation, or both.

49. The curable adhesive article of claim 44 wherein the outermost layer of the curable adhesive article comprises a curable adhesive layer.

* * * * *

UNITED STATES PATENT AND TRADEMARK OFFICE
CERTIFICATE OF CORRECTION

PATENT NO. : 7,713,604 B2
APPLICATION NO. : 10/513180
DATED : May 11, 2010
INVENTOR(S) : Jie Yang It is certified that error appears in the above-identified patent and that said Letters Patent is hereby corrected as shown below:

Column 4
Line 2; Delete "crosssection" and insert -- cross-section --, therefor.
Line 45; Delete "Reinbold," and insert -- Reinhold, --, therefor.

Column 8
Line 42; Delete "bubbles;" and insert -- bubbles, --, therefor.

Column 9
Line 43; After "in" insert -- combination with other ingredients of the adhesive, to provide a desired balance of --.

Column 11
Line 36; Delete "expoxies" and insert -- epoxies --, therefor.

Column 12
Line 27; Delete "an 8gram" and insert -- an 8 gram --, therefor.

Column 15
Line 17; Delete "4,868,28;" and insert -- 4,868,288; --, therefor.

Column 21
Line 66; Delete "photosensitzer" and insert -- photosensitizer --, therefor.

Column 22
Line 6; Before "hexagon" delete "is".

Column 24
Line 63; Delete "tripyhenylsulfonium" and insert -- triphenylsulfonium --, therefor.

Signed and Sealed this
First Day of May, 2012

David J. Kappos
*Director of the United States Patent and Trademark Office*

Column 25
Line 52; Delete "cross section" and insert -- cross-section --, therefor.

Column 29
Line 16; In Claim 43, after "comprising" insert -- the --.